(12) United States Patent
Sato et al.

(10) Patent No.: US 6,985,632 B2
(45) Date of Patent: Jan. 10, 2006

(54) IMAGE PROCESSING SYSTEM, IMAGE PROCESSING APPARATUS, AND IMAGE PROCESSING METHOD

(75) Inventors: Makoto Sato, Tokyo (JP); Tomohiko Matsuura, Tochigi (JP); Hiroyuki Shinbata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 762 days.

(21) Appl. No.: 09/835,329

(22) Filed: Apr. 17, 2001

(65) Prior Publication Data

US 2002/0003905 A1 Jan. 10, 2002

(30) Foreign Application Priority Data

Apr. 17, 2000 (JP) .............................. 2000-115519
Oct. 25, 2000 (JP) .............................. 2000-325590
Oct. 27, 2000 (JP) .............................. 2000-329422

(51) Int. Cl.
G06K 9/36 (2006.01)
H04N 7/12 (2006.01)
(52) U.S. Cl. ................................. 382/240; 375/240.18
(58) Field of Classification Search ................ 382/232, 382/233, 240, 132, 244, 247, 248, 238, 251; 341/50, 54; 375/240.18, 240.19
See application file for complete search history.

(56) References Cited

U.S. PATENT DOCUMENTS

| 5,402,248 | A | 3/1995 | Sato et al. | 358/426 |
|---|---|---|---|---|
| 5,812,146 | A | 9/1998 | Sato et al. | 345/501 |
| 5,861,892 | A | 1/1999 | Sato et al. | 345/435 |
| 6,215,421 | B1 * | 4/2001 | Kondo et al. | 341/50 |
| 6,396,958 | B1 * | 5/2002 | Wilson | 382/246 |
| 6,512,853 | B2 * | 1/2003 | Kennedy et al. | 382/238 |
| 6,580,834 | B2 * | 6/2003 | Li et al. | 382/251 |
| 6,614,939 | B1 * | 9/2003 | Yamauchi | 382/240 |

FOREIGN PATENT DOCUMENTS

JP 9212623 8/1997

OTHER PUBLICATIONS

Stephane G. Mallat, "A Theory For Multiresolution Signal Decomposition: The Wavelet Representation", IEEE Transactions On Pattern Analysis And Machine Intelligence, vol. 7, Jul. 1989, pp. 679-693.

* cited by examiner

Primary Examiner—Kanjibhai Patel
(74) Attorney, Agent, or Firm—Fitzpatrick, Cella, Harper & Scinto

(57) ABSTRACT

Obtains an image from which noise is removed upon compressing or decoding and displaying an image containing noise. To accomplish this, a subband to which a wavelet transform coefficient of interest belongs is checked upon entropy decoding, and when the coefficient belongs to a subband other than LL, decoding is aborted at a predetermined lower-limit bit plane, and all bits contained in bit planes from the lower-limit bit plane to the least significant bit plane are set at zero.

32 Claims, 37 Drawing Sheets

FIG. 5A

| MH | TH0 | BS0 | TH1 | BS1 | ... | THn-1 | BSn-1 |

FIG. 5B

| IMAGE SIZE | TILE SIZE | NUMBER OF COMPONENTS | COMPONENT INFORMATION |

FIG. 5C

| TILE LENGTH | ENCODING PARAMETER |

FIG. 5D

| LL | HL2 | LH2 | LL | ... | LL | HL2 | LH2 | HH2 | HL1 | LH1 | HH1 |

(S-1) BIT PLANE | (S-2) BIT PLANE | 0 BIT PLANE

FIG. 6

| PATIENT'S NAME | IMAGE SENSING DATA | X-RAY DOSAGE | CODE SEQUENCE |
|---|---|---|---|

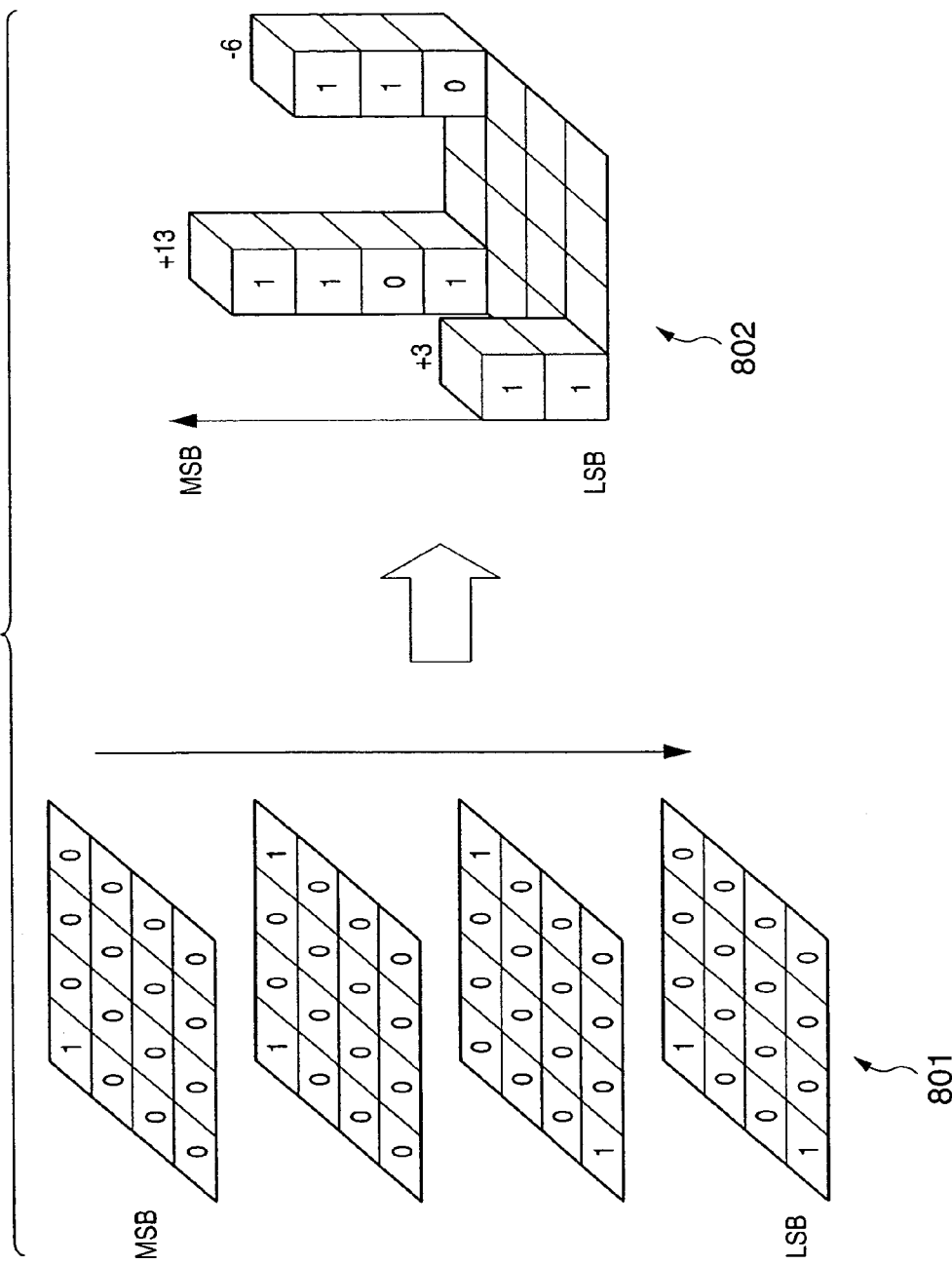

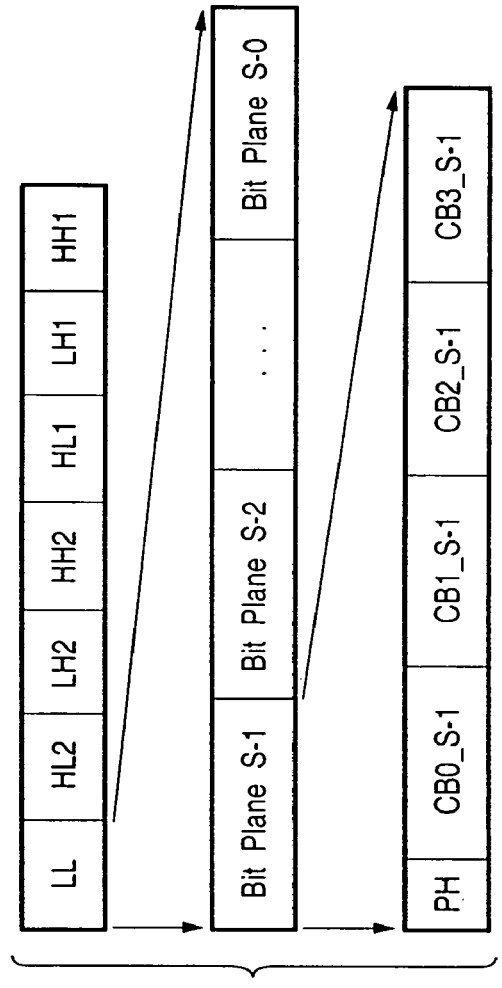

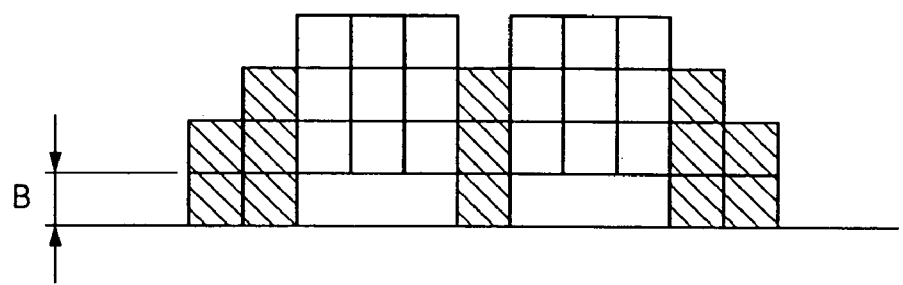
F I G. 21

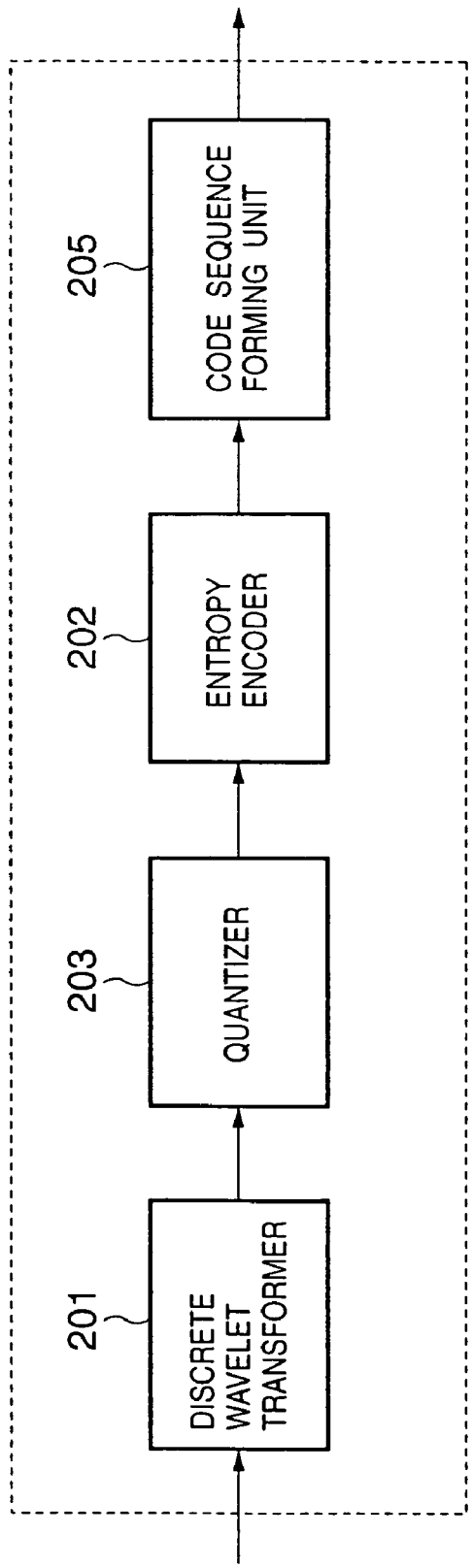

FIG. 30A
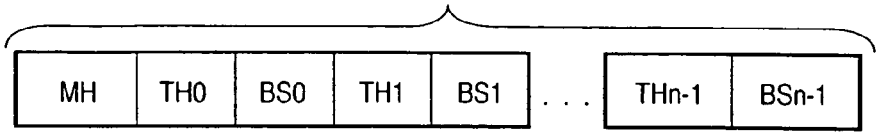
FIG. 30B
| IMAGE SIZE | TILE SIZE | NUMBER OF COMPONENTS | COMPONENT INFORMATION |
FIG. 30C
| TILE LENGTH | ENCODING PARAMETER |
FIG. 30D
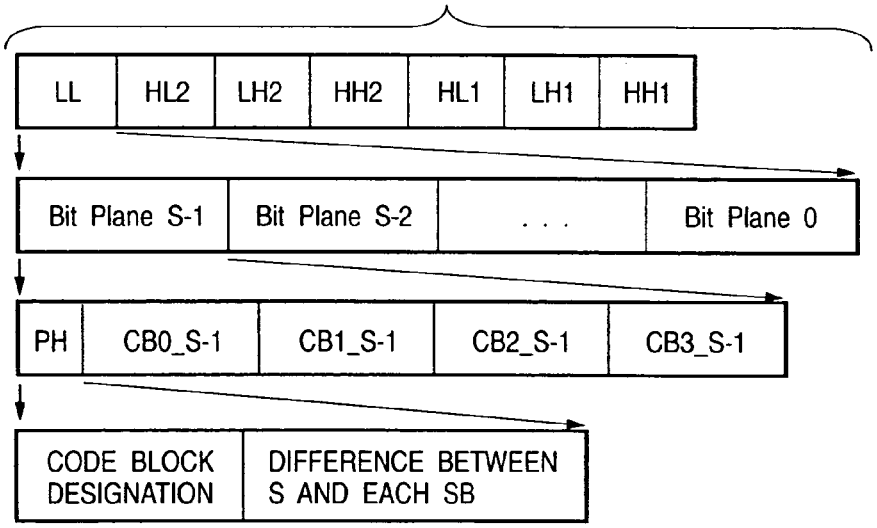
FIG. 30E
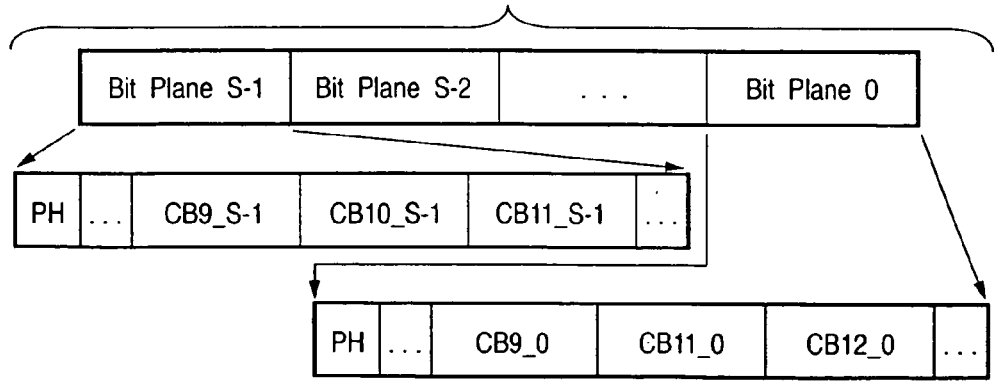

FIG. 32

| LL | 0 | 0 |
|----|---|---|
| 0  | 0 |   |
| 0  |   | 0 |

FIG. 37

| LL | HL2 | 0 |
|----|-----|---|
| LH2 | HH2 | |
| 0 | | 0 |

IMAGE PROCESSING SYSTEM, IMAGE PROCESSING APPARATUS, AND IMAGE PROCESSING METHOD

FIELD OF THE INVENTION

The present invention relates to an image processing system and method for encoding/decoding an image.

BACKGROUND OF THE INVENTION

Many image compression coding techniques have been proposed since a storage medium having a very large size is required to save an image with high resolution and high pixel precision as a raw image.

For example, a technique for saving/transferring X-ray medical images in an electronic format, and using them in diagnosis has been proposed. In the medical field, images preferably have highest possible resolution, and an effective image compression method is demanded.

On the other hand, various techniques for canceling noise appearing in images have been proposed and are used in various fields.

However, no technique for effectively reducing noise in the image encoding/decoding process has been proposed yet.

For example, in an image sensing device using X-rays, the X-ray dosage upon image sensing is preferably as small as possible in consideration of the influences on a patient. But an image sensed with a small X-ray dosage contains many quantization noise components, which disturb diagnosis. As a method of reducing such quantization noise in a medical image, a method that exploits multiresolution analysis is known, as disclosed in Japanese Patent Laid-Open No. 09-212623. According to this technique, it is possible to remove noise based on the multiresolution analysis result of an image. However, in order to incorporate such method in a conventional apparatus, a noise removal process must be added. Also, when this method is combined with image coding, flexible adjustment of image quality is disturbed upon display.

SUMMARY OF THE INVENTION

The present invention has been made in consideration of the conventional problems, and has as its object to provide an image processing system, image processing apparatus, and image processing method, which can remove noise contained in an original image upon compressing/decompressing an image.

In order to achieve the above object, an image processing system according to the present invention is an image processing system for encoding and decoding an image, comprising:

an encoding device for encoding an image in units of bit planes to generate a code sequence; and a decoding device for decoding the code sequence in units of bit planes to generate an image, wherein noise in an image is removed by deleting data of bit planes of levels lower than a lower-limit bit plane in the encoding device and/or the decoding device.

Another image processing system according to the present invention is an image processing system for encoding and decoding an image, comprising:

an encoding device for generating a code sequence by generating transform coefficients in units of a plurality of frequency ranges by means of frequency transformation of an image, and encoding the transform coefficients; and a decoding device for restoring the transform coefficients from the code sequence, reclaiming a reference image on the basis of the transform coefficients of a given frequency range of the restored transform coefficients, and removing noise by processing the transform coefficients of the frequency ranges other than the given frequency range on the basis of the reference image.

An image processing apparatus according to the present invention is an image processing apparatus for encoding an image, which generates a code sequence by encoding an image in units of bit planes, and removes noise on the image by deleting data of bit planes of levels lower than a lower-limit bit plane.

Another image processing apparatus according to the present invention is an image processing apparatus for decoding an image, which reclaims an image by decoding an image in units of bit planes, and removes noise on the image by deleting data of bit planes of levels lower than a lower-limit bit plane.

Still another image processing apparatus according to the present invention is an image processing apparatus for decoding an image, which restores transform coefficients from a code sequence obtained by computing and encoding frequency transforms of an image, and reclaims a reference image on the basis of the transform coefficients of a given frequency range of the restored transform coefficients, and removes noise by processing the transform coefficients of frequency ranges other than the given frequency range on the basis of the reference image.

An image processing method according to the present invention is an image processing method for encoding and decoding an image, comprising:

an encoding step of encoding an image in units of bit planes to generate a code sequence; and a decoding step of decoding the code sequence in units of bit planes to generate an image, wherein noise on an image is removed by deleting data of bit planes of levels lower than a lower-limit bit plane in the encoding step and/or the decoding step.

Another image processing method according to the present invention is an image processing method for decoding an image, comprising:

a step of restoring transform coefficients from a code sequence obtained by computing and encoding frequency transforms of an image, and reclaiming a reference image on the basis of the transform coefficients of a given frequency range of the restored transform coefficients; and a step of removing noise by processing the transform coefficients of frequency ranges other than the given frequency range on the basis of the reference image.

A computer program product according to the present invention embodies a program for implementing an image processing method for encoding and decoding an image, and the program comprises:

program code for a encoding step of encoding an image in units of bit planes to generate a code sequence; and program code for a decoding step of decoding the code sequence in units of bit planes to generate an image, wherein noise on an image is removed by deleting data of bit planes of levels lower than a lower-limit bit plane in the encoding step and/or the decoding step.

Another computer program product according to the present invention embodies a program for implementing an image processing method for decoding an image, and the program comprises:

program code for a step of restoring transform coefficients from a code sequence obtained by computing and encoding frequency transforms of an image, and reclaiming a reference image on the basis of the transform coefficients of a given frequency range of the restored transform coefficients; and program code for a step of removing noise by processing the transform coefficients of frequency ranges other than the given frequency range on the basis of the reference image.

A computer data signal according to the present invention is embodied in a propagating wave, is used for implementing an image processing method for encoding and decoding an image, and comprises:

code signals used in an encoding step of encoding an image in units of bit planes to generate a code sequence; and code signals used in a decoding step of decoding the code sequence in units of bit planes to generate an image, wherein noise on an image is removed by deleting data of bit planes of levels lower than a lower-limit bit plane in the encoding step and/or the decoding step.

Another computer data signal according to the present invention is embodied in a propagating wave, is used for implementing an image processing method for decoding an image, and comprises:

code signals used in a step of restoring transform coefficients from a code sequence obtained by computing and encoding frequency transforms of an image, and reclaiming a reference image on the basis of the transform coefficients of a given frequency range of the restored transform coefficients; and code signals used in a step of removing noise by processing the transform coefficients of frequency ranges other than the given frequency range on the basis of the reference image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A to 5D show the format of a code sequence according to the first embodiment of the present invention;

FIG. 6 shows a format of a file according to the first embodiment of the present invention;

FIG. 8 is a view for explaining the operation of an entropy decoder according to the first embodiment of the present invention;

FIG. 16A shows a format of an overall code sequence according to the third embodiment of the present invention, FIG. 16B shows a main header MH, FIG. 16C shows a tile header TH, and FIG. 16D shows a format of a bitstream and a bit plane;

FIG. 21 shows a state wherein an entropy encoder according to the fourth embodiment of the present invention executes a bit-shift process of quantization indices of a region of interest (ROI);

FIG. 29 is a schematic block diagram showing an arrangement of an encoding device according to the seventh embodiment of the present invention;

FIGS. 30A to 30E show the format of a code sequence according to the seventh embodiment of the present invention;

FIG. 32 shows an example of subbands upon generating a reference image according to the seventh embodiment of the present invention;

FIG. 37 shows another example of subbands upon generating the reference image according to the seventh embodiment of the present invention.

DETAILED DESCRIPTION OF THE PREFERRED EMBODIMENTS

Preferred embodiments of the present invention will be exemplified in detail hereinafter with reference to the accompanying drawings. Note that the scope of the present invention is not limited to the relative positions of building components, the processing order, and the like described in these embodiments unless otherwise specified.

[First Embodiment]

An image processing system for executing a series of processes when medical images are processed as an electronic format according to the first embodiment of the present invention will be described.

Figure 1:
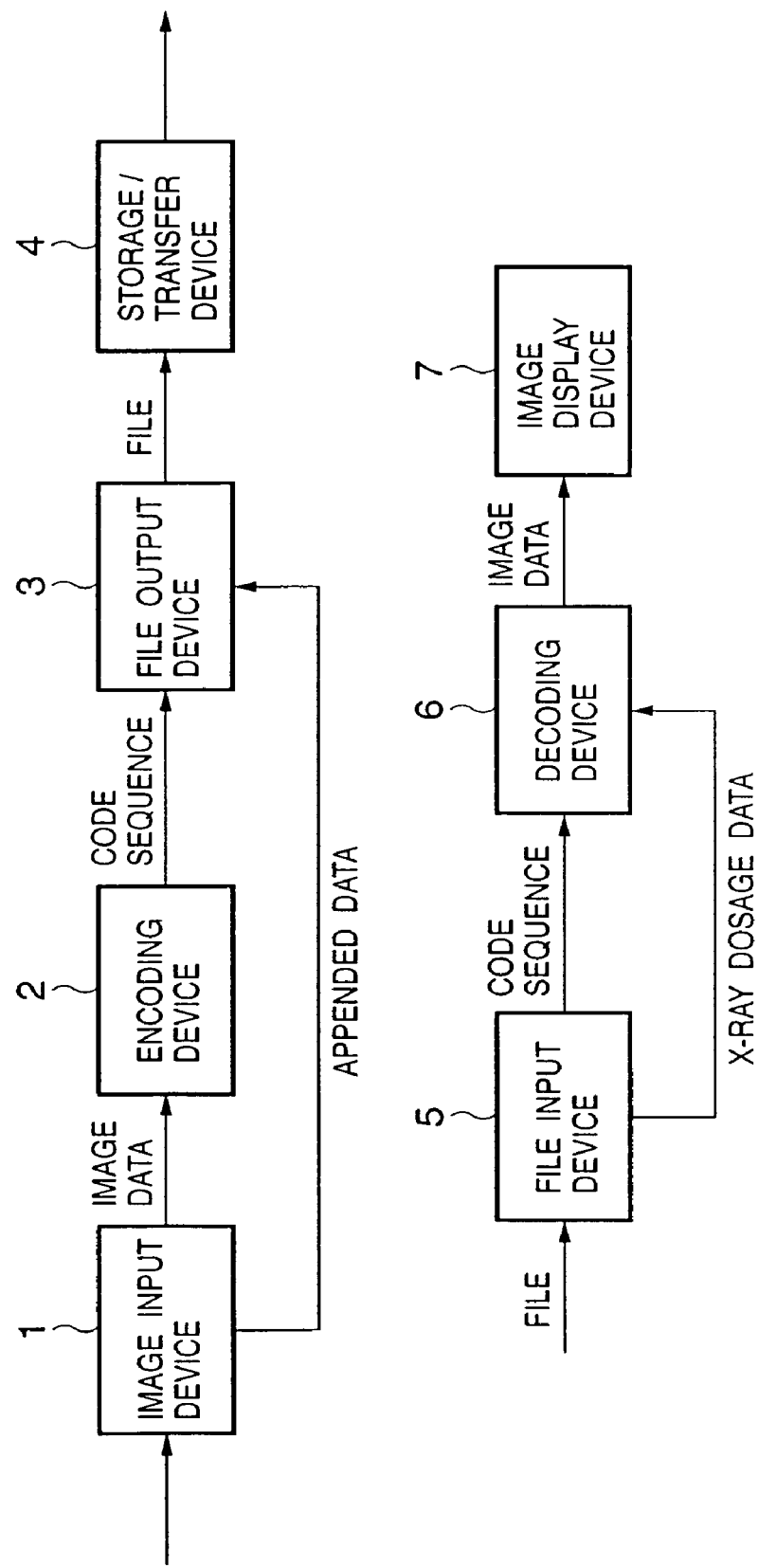
FIG. 1 is a schematic block diagram showing an arrangement of an image processing system according to the first embodiment of the present invention.

FIG. 1 shows a schematic arrangement of an image processing system of this embodiment. Referring to FIG. 1, an image input device 1 is an image sensing device using X-rays, and generates and outputs required images using a sensor corresponding to a purpose intended. An image generated by this device has a resolution of 2500×2500 pixels (vertical×horizontal) or higher, and the precision of each pixel is expressed by 12 bits. Since a large-size storage medium is required to save such image having high resolution and high pixel precision as a raw image, the image undergoes compression coding as needed.

An encoding device 2 in FIG. 1 is used to compress such image, and reversibly or irreversibly compression-encodes an image input from the image input device 1 by a predetermined scheme. Note that reversible compression that can completely preserve information contained in an image is prevalently used for medical images according to their purpose. As a compression encoding scheme therefor, a reversible compression mode in JPEG as a compression encoding scheme recommended by ISO and ITU-T is used. Note that so-called JPEG2000 that computes the wavelet transforms of an image, and entropy-encodes transform coefficients in units of bit planes also allows reversible compression, and is suitable for compressing medical images.

An image signal that has undergone compression encoding is outputted as a code sequence to a file output device 3. The file output device 3 forms a file format by appending information required for diagnosis (e.g., a patient's name, image sensing conditions, and the like) to the code sequence that has undergone compression encoding by the encoding device 2, and outputs the file to a storage/transfer device 4. The storage/transfer device 4 stores the converted data having the predetermined format as a file or transfers it to another device.

Note that a storage medium uses a hard disk, MO, or the like, and a network or the like is used upon transfer. The following process is done to display the stored/transferred data.

The file output from the storage/transfer device 4 is read by a file input device 5, and after required information is extracted from the file, the code sequence is outputted to a decoding device 6. The decoding device 6 decodes the input code sequence to reclaim an original image signal, and outputs that signal to an image display device 7. The image display device 7 displays the input image signal, which is used in, e.g., diagnosis.

Details of the encoding process in the image processing system according to this embodiment will be explained below using the flow chart in FIG. 10.

In step S1201, an image signal is input from the image input device, and is outputted to the encoding device 2.

Figure 2:
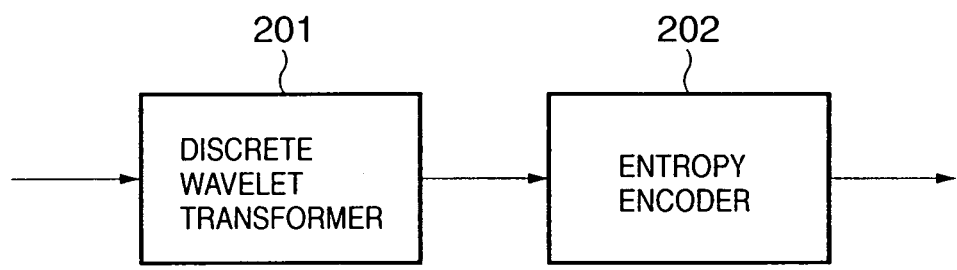
FIG. 2 is a block diagram showing an arrangement of an encoding device according to the first embodiment of the present invention.

FIG. 2 shows an arrangement of the encoding device 2.

In step S1202, a discrete wavelet transformer 201(FIG. 2) executes a transform process of the image signal input to the encoding device 2 to generate transform coefficients. The transform coefficients are encoded (entropy-encoded) by an entropy encoder 202.

The internal arrangement of the encoding device 2 will be described in detail below.

The discrete wavelet transformer 201 executes a two-dimensional discrete wavelet transform process of the image signal input from the image input device 1, and computes and outputs transform coefficients.

Figure 3A:
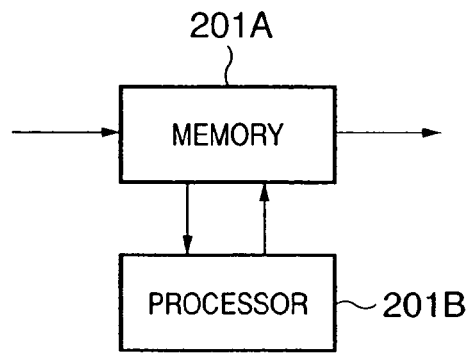
FIGS. 3A to 3C are views showing a basic arrangement of a discrete wavelet transformer according to the first embodiment of the present invention.
Figure 3B:
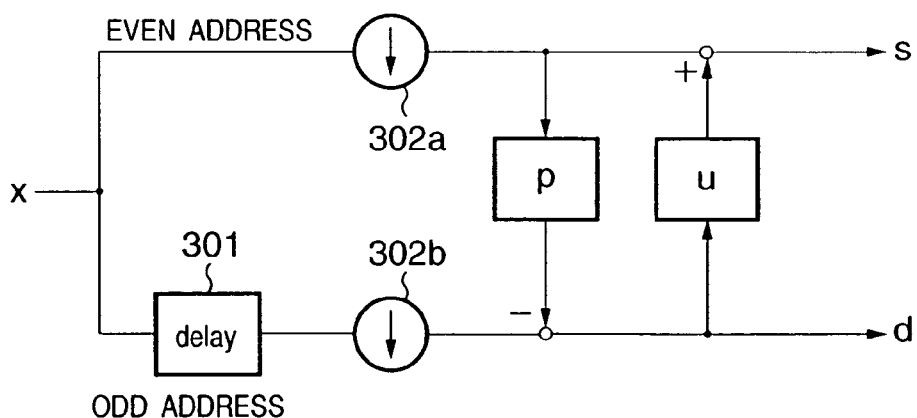

FIG. 3A shows a basic arrangement of the discrete wavelet transformer 201. An image signal input from the image input device 1 is stored in a memory 201A, and is sequentially read out by a processor 201B to undergo a discrete wavelet transform process. As a result of discrete wavelet transformation, transform coefficients are generated, and are written in the memory 201A. FIG. 3B shows an internal arrangement of the processor 201B. As shown in FIG. 3B, the input image signal is separated into odd and even address signals by a combination of a delay element 301 and down samplers 302a and 302b. Furthermore, these signals undergo filter processes of two filters p and u. In FIG. 3B, s and d represent low- and high-pass coefficients upon decomposing a linear image signal to one level, and are respectively computed by:

$$d(n)=x(2n+1)-\text{floor}((x(2n)+x(2n+2))/2) \quad (1)$$

$$s(n)=x(2n)+\text{floor}((d(n-1)+d(n))/4) \quad (2)$$

where x(n) is an image signal at address n to be transformed, and floor(x) is a function of returning a maximum integer smaller than x.

With this process, the linear discrete wavelet transform process is done for an image signal. Since two-dimensional discrete wavelet transformation is implemented by sequentially executing linear discrete wavelet transformation in the horizontal and vertical directions of an image and its details are known to those who are skilled in the art, a description thereof will be omitted.

Figure 3C:
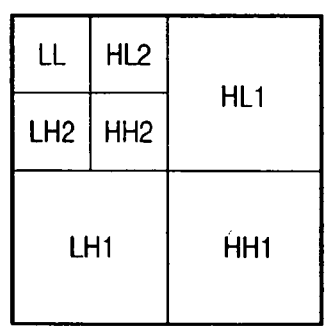

FIG. 3C shows an example of a format of transform coefficient groups of two levels obtained by the two-dimensional discrete wavelet transform process. An image signal is decomposed into coefficient sequences HH1, HL1, LH1, . . . , and LL in different frequency bands. Note that a detailed description of discrete wavelet transformation will be omitted since it is a state-of-the-art technique as described in, e.g., Stephane G. Mallat, "A Theory for Multiresolution Signal Decomposition: The wavelet representation", IEEE Trans. on Pattern Analysis and Machine Intelligence, Vol. 11, No. 7, July 1989. This embodiment is based on a method of recursively decomposing low-frequency sequences. In the following description, these coefficient sequences will be referred to as subbands. The coefficients of the individual subbands are output to the entropy encoder 202. In FIG. 3C, the number of decompositions (levels) upon decomposing into frequency bands is 2, but the present invention is not limited to this, and an arbitrary number of decompositions equal to or larger than 1 may be used.

The entropy encoder 202 decomposes the input transform coefficients into bit planes, executes binary arithmetic coding in units of bit planes, and outputs code sequences.

Figure 4:
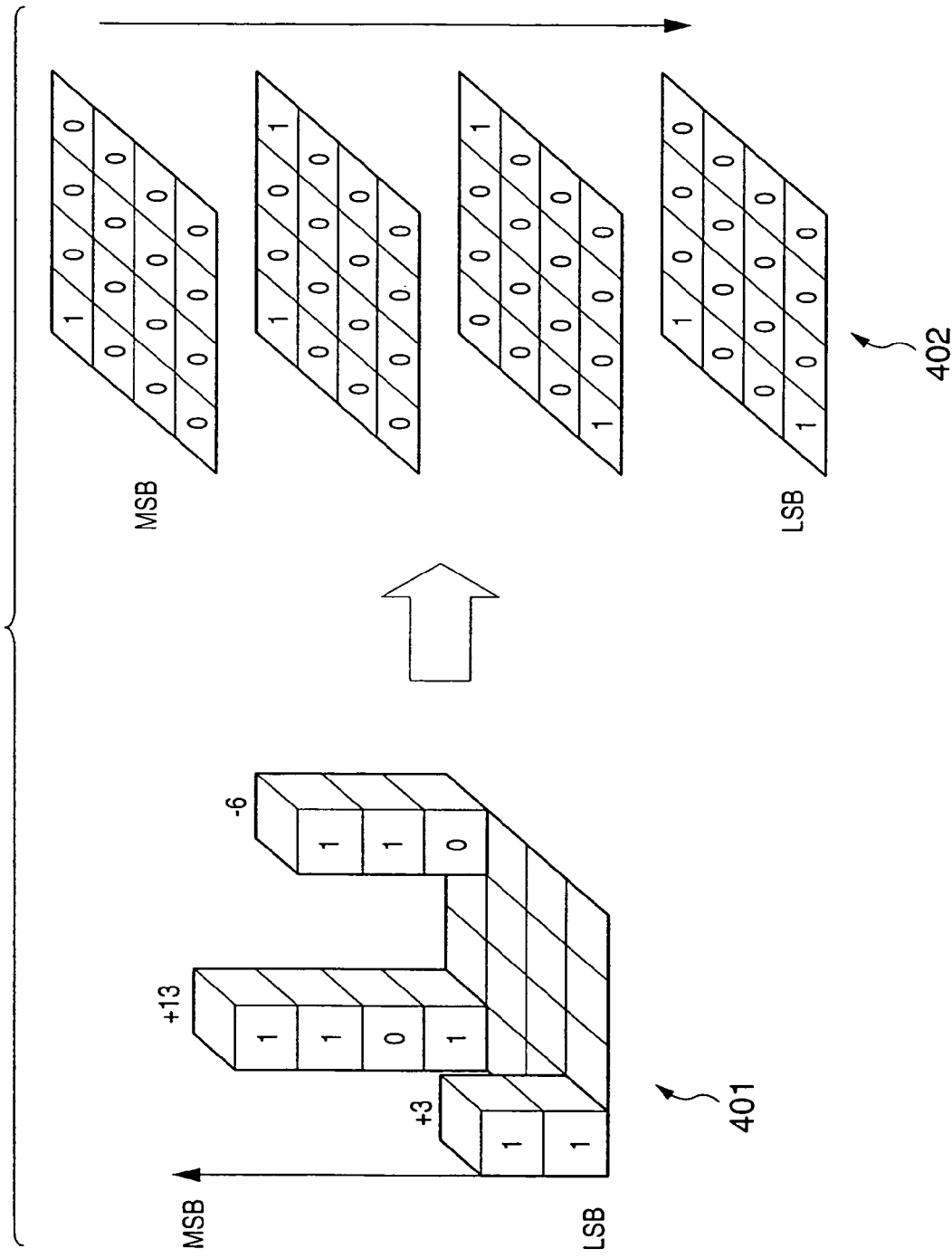
FIG. 4 is a view for explaining the operation of an entropy encoder according to the first embodiment of the present invention.

FIG. 4 is a view for explaining the operation of the entropy encoder 202. FIG. 4 exemplifies a 4×4 subband region which includes three nonzero quantization indices (+13, −6, +3). The entropy encoder 202 scans the subband region to obtain a maximum value M, and computes the number S of bits required for expressing the maximum value M by:

$$S = \operatorname{ceil}(\log_2(\operatorname{abs}(M))) \quad (3)$$

where ceil(x) is the smallest one of integers equal to or larger than x. This process corresponds to step S1203 in FIG. 10.

In FIG. 4, since the maximum transform coefficient value is 13, as indicated by 401, S is 4. Hence, 16 transform coefficients in the sequence are decomposed into four bit planes, as indicated by 402 in FIG. 4. This process corresponds to step S1204 in FIG. 10. The flow then advances to step S1205, and the entropy encoder 202 executes a process in units of bit planes. The entropy encoder 202 makes binary arithmetic coding of bits of the most significant bit plane (MSB) first, and outputs the coding result as a bitstream. Then, the encoder 202 lowers the bit plane by one level, and encodes bits of each bit plane to output a bitstream until the bit plane of interest reaches the least significant bit plane (LSB). At this time, a sign of each transform coefficient is entropy-encoded immediately after the first nonzero bit is detected in the bit plane. In step S1206 in FIG. 10, a code sequence containing bitstreams is generated and output.

FIGS. 5A to 5D show the format of a code sequence which is generated and outputted in this way. FIG. 5A shows an overall format of a code sequence, in which MH is a main header; TH, a tile header; and BS, a bitstream. As shown in FIG. 5B, the main header MH is comprised of the size (the numbers of pixels in the horizontal and vertical directions) of an image to be encoded, a size upon breaking up the image into tiles as a plurality of rectangular regions, the number of components indicating the number of color components, the size of each component, and component information indicating bit precision. In this embodiment, since an image is not broken up into tiles, the tile size is equal to the image size. When the image to be encoded is a monochrome multi-valued image, the number of components is "1".

FIG. 5C shows a format of the tile header TH. The tile header TH consists of a tile length including the bitstream length and header length of the tile of interest, and an encoding parameter for the tile of interest. The encoding parameter includes a discrete wavelet transform level, filter type, and the like. FIG. 5D shows a format of the bitstream of this embodiment. The bitstream is formed in units of bit planes, which are arranged in the order from the MSB to the LSB. In each bit plane, the encoding results of the bit plane of transform coefficients in respective subbands are arranged in units of subbands.

Also, S indicates the number of bits required for expressing a maximum quantization index, and is computed by equation (3) above. The code sequence generated in this manner is outputted to the file output device 3.

In the aforementioned processes, since an image signal is expressed as coefficients of integers as a result of arithmetic operations of equations (1) and (2), and no information loss occurs in the subsequent entropy encoder 202, an original image can be completely reclaimed by decoding the generated code sequence (reversible compression).

Figure 10:
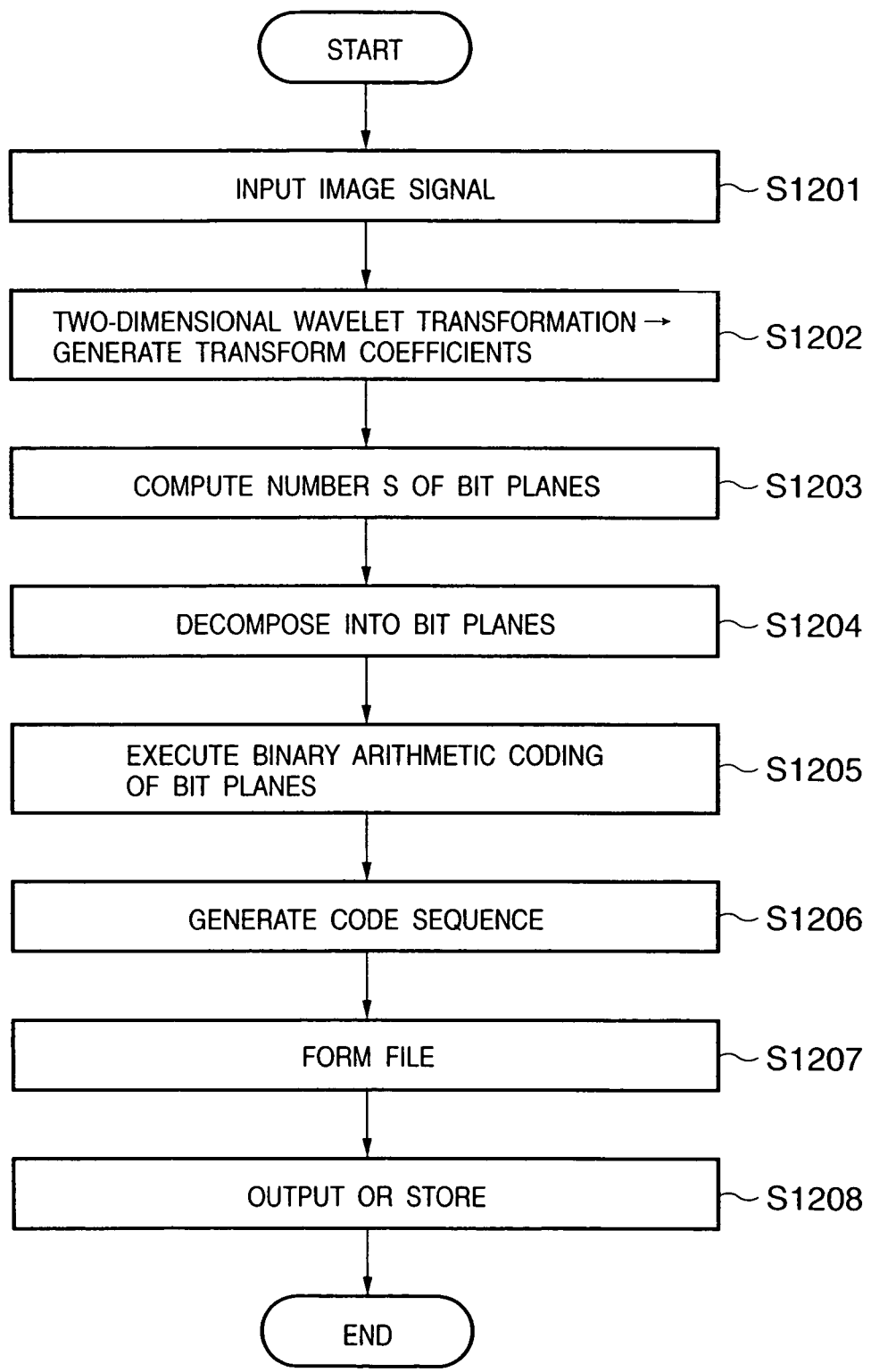
FIG. 10 is a flow chart showing the operation of the encoding device according to the first embodiment of the present invention.

In step S1207 in FIG. 10, the file output device 3 forms a file to be stored in or transferred by the storage/transfer device 4 on the basis of the code sequence input from the encoding device 2 and additional data input from the image input device 1. At this time, the additional data input from the image input device 1 includes the name of the patient to be sensed, image sensing data, X-ray dosage upon image sensing, and the like. FIG. 6 shows an example of a file formed by combining the additional data and code sequence. The file output device 3 outputs the file with the format shown in FIG. 6 to the storage/transfer device 4. In step S1208, the storage/transfer device 4 stores the input file or outputs it to an external apparatus via, e.g., a network in accordance with a purpose intended.

Details of the decoding process in the image processing system according to this embodiment will be explained below using the flow chart in FIG. 11.

In step S1301, the file stored by the storage/transfer device 4 is read by the file input device 5 (FIG. 1). In step S1302, the file input device 5 analyzes the input file and separates the file into data (the name of the patient to be sensed, image sensing data, and X-ray dosage upon image sensing) appended by the file output device 3, and the code sequence generated by the encoding device 2. The code sequence is outputted to the decoding device 6 to undergo a decoding process, and the X-ray dosage data in the data appended by the file output device 3 is also output to the decoding device 6.

Figure 7:
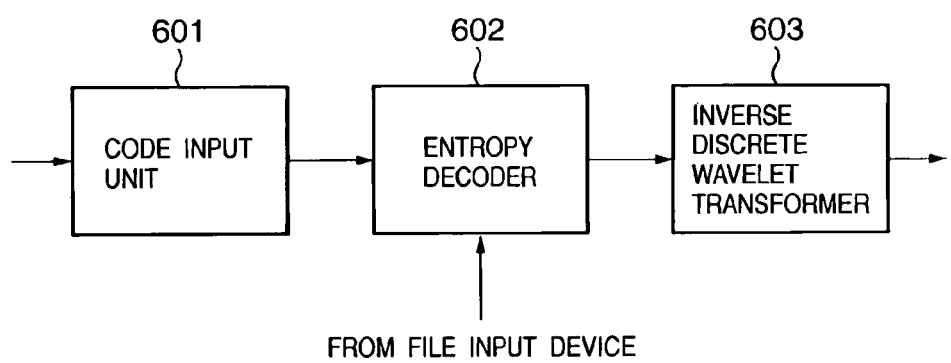
FIG. 7 is a block diagram showing an arrangement of a decoding device according to the first embodiment of the present invention.

FIG. 7 is a block diagram showing an arrangement of the decoding device 6 in this embodiment. Reference numeral 601 denotes a code input unit; 602, an entropy decoder; and 603, an inverse wavelet transformer.

The code input unit 601 receives a code sequence, analyzes the headers (MH and TH) included in that sequence to extract parameters required for the subsequent processes, and controls the flow of processes if necessary or outputs required parameters to the subsequent processing units. The bitstreams included in the code sequence are output to the entropy decoder 602.

The entropy decoder 602 decodes the bitstreams in units of bit planes and outputs the decoding result to the inverse discrete wavelet transformer 603. FIG. 8 shows a process of the entropy decoder 602. 801 illustrates the flow of sequentially decoding a given subband region to be decoded in units of bit planes, and bit planes are decoded from MSB to LSB to restore transform coefficients.

Also, the entropy decoder 602 determines transform coefficient values to be output to the inverse discrete wavelet transformer 603 on the basis of the X-ray dosage input from the file input device 5. The entropy decoder 602 computes a noise amount $\epsilon$ determined from the X-ray dosage by a predetermined method (step S1303), and then computes a lower-limit bit plane L (step S1304) by:

$$L=\text{ceil}(\log_2(\epsilon))+1; \epsilon \geq 1 \quad (4)$$

$$L=0; \epsilon=0 \quad (5)$$

where $\epsilon$ is expressed by an integer equal to or larger than 1. The entropy decoder 602 checks subbands to which the restored transform coefficients belong (step S1305). If the coefficient of interest belongs to a subband other than LL, the entropy decoder 602 aborts bit plane decoding in 801 at an L bit plane (lower-limit bit plane upon decoding), sets zero in all bits contained in subsequent bit planes up to the LSB (step S1306), and outputs them to the subsequent inverse discrete wavelet transformer 603. For example, when the lower-limit bit plane L is 1 in the coefficient distribution indicated by 801, since all transform coefficients contained in the LSB are replaced by zero, coefficient values to be output to the inverse discrete wavelet transformer 603 are 12, 6, and 2.

When the restored transform coefficient belongs to an LL subband, all bit planes are decoded ordinarily (step S1307).

Figure 9A:
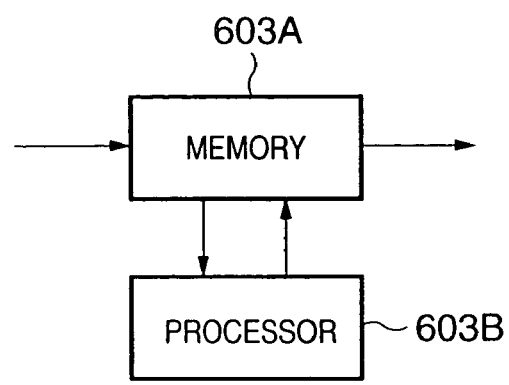
FIGS. 9A and 9B are views showing an arrangement of an inverse discrete wavelet transformer according to the first embodiment of the present invention.
Figure 9B:
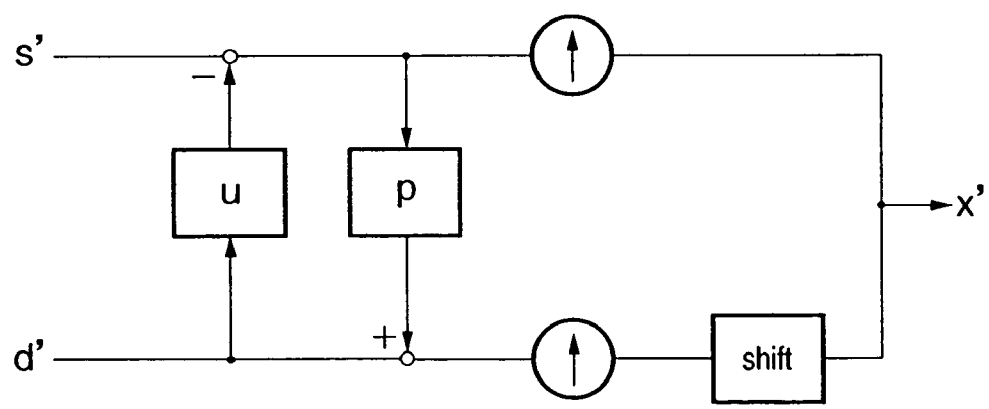

FIGS. 9A and 9B are block diagrams showing an arrangement and processing of the inverse discrete wavelet transformer 603. Referring to FIG. 9A, the input transform coefficients are stored in a memory 603A. A processor 603B executes a linear inverse discrete wavelet transform process and implements a two-dimensional inverse discrete wavelet transform process by sequentially reading out the transform coefficients from the memory 603A (step S1308). The two-dimensional inverse discrete wavelet transform process is executed in a sequence opposite to the forward transform, but since the details are known to those who are skilled in the art, a description thereof will be omitted. FIG. 9B shows a processing blocks of the processor 603B. The input transform coefficients undergo two filter processes of filters u and p, and are added to each other after being up-sampled, thus outputting an image signal x'. These processes are described by:

$$x'(2n)=s'(n)-\text{floor}((d'(n-1)+d'(n))/4) \quad (6)$$

$$x'(2n+1)=d'(n)+\text{floor}((x'(2n)+x'(2n+2))/2) \quad (7)$$

With the aforementioned processes, the image is reclaimed, and is outputted to and displayed on the image display device 7 which comprises a CRT, liquid crystal display, or the like (step S1309).

As described above, according to this embodiment, transform coefficients obtained by a discrete wavelet transform process of an image are encoded in units of bit planes in turn from the MSB bit plane. In a process for decoding this code sequence, a bit plane corresponding to the value of the noise amount $\epsilon$ is used as a lower-limit bit plane upon decoding. In this manner, when an image contains noise, a decoded image from which noise components are removed can be obtained.

Note that the lower-limit bit plane may be determined in units of subbands.

Figure 11:
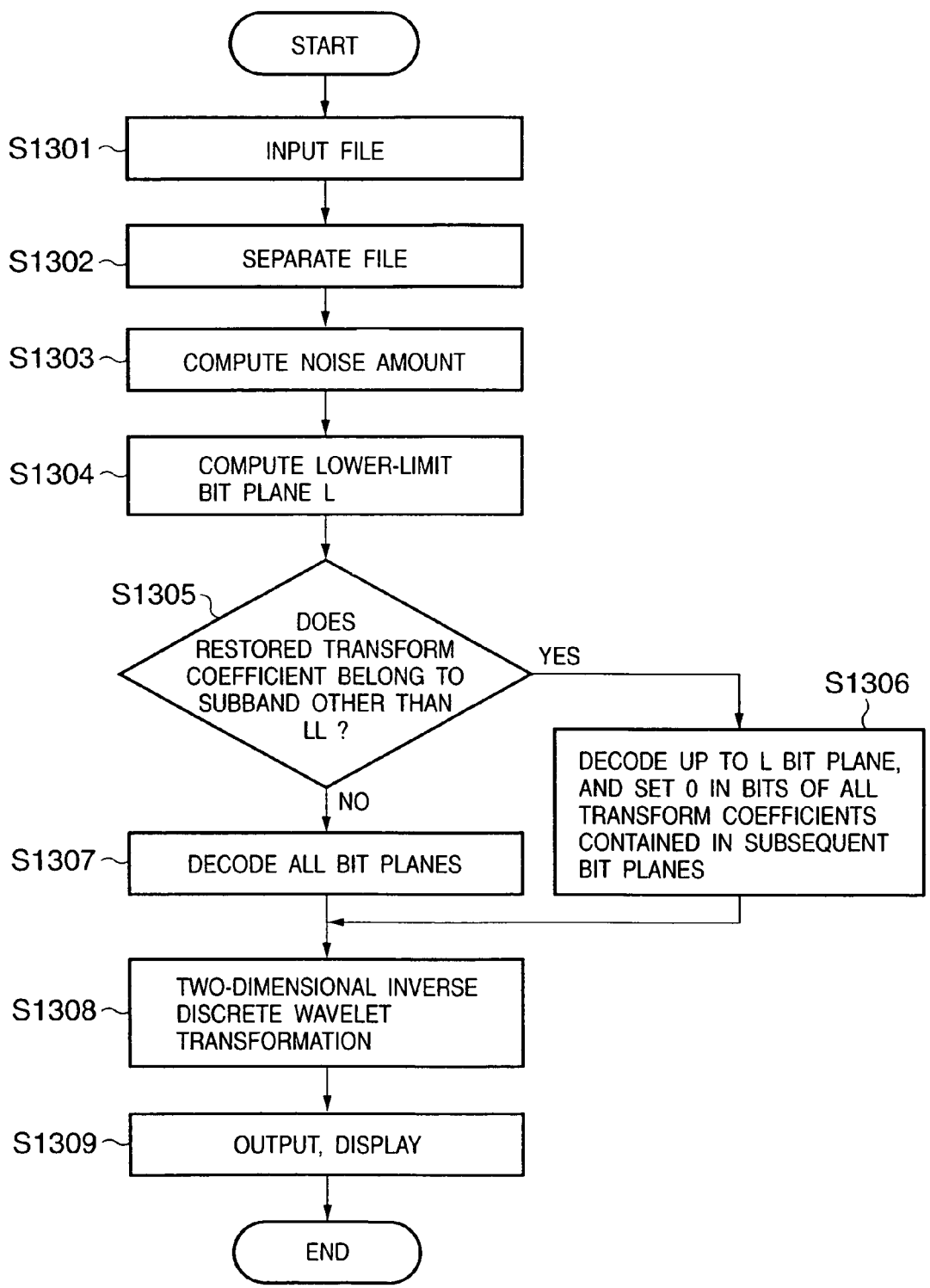
FIG. 11 is a flow chart showing the operation of the decoding device according to the first embodiment of the present invention.

Note also that the program codes according to the flow charts shown in FIGS. 10 and 11 are stored in a memory such as a ROM, RAM, or the like (not shown) of the encoding or decoding device.

[Second Embodiment]

In the decoding device of the first embodiment, the lower-limit bit plane of the transform coefficient to be decoded is controlled in accordance with the noise amount $\epsilon$. But in some cases, a noise removal process need be controlled more flexibly. As the second embodiment of the present invention devised to this end, a decoding device having an arrangement for implementing a noise removal process by finer control will be explained. Since the arrangement of the overall image processing system and building components other than the decoding device 6 are the same as those in the first embodiment, a description thereof will be omitted.

Figure 12:
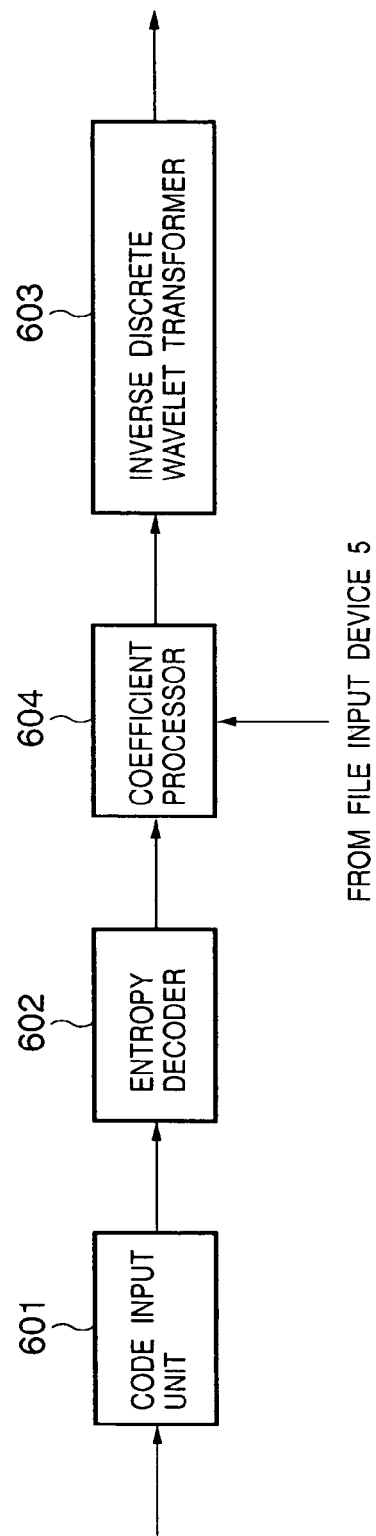
FIG. 12 is a block diagram showing an arrangement of a decoding device according to the second embodiment of the present invention.

FIG. 12 shows an arrangement of the decoding device 6 according to this embodiment.

Referring to FIG. 12, a code sequence output from the code input unit 601 is decoded by the entropy decoder 602 in units of bit planes. In this embodiment, the entropy decoder 602 decodes all the input bit planes, and outputs restored transform coefficients to a coefficient processor 604. The coefficient processor 604 computes a noise amount $\epsilon$ determined from the X-ray dosage input from the file input device 6 by a predetermined method, and then computes a lower-limit bit plane L based on equations (4) and (5). The coefficient processor 604 then computes transform coefficients c' corrected by:

$$c'=c; \text{abs}(c)>2^L \quad (8)$$

$$c'=\text{sign}(c)(\text{abs}(c)-T); \text{abs}(c) \leq 2^L \quad (9)$$

for transform coefficients of subbands other than LL from a predetermined threshold value T based on the noise component $\epsilon$, and outputs the computed coefficients.

The inverse discrete wavelet transformer 603 computes inverse transforms using c', and outputs a reclaimed image to the image display device 7.

With the aforementioned processes, transform coefficients contained in bit planes below the bit plane L undergo a threshold value process by setting a predetermined threshold value, thus achieving a noise removal process at finer level in the decoding process.

The process for correcting transform coefficients using equations (8) and (9) can be executed before step S1308 in FIG. 11.

In the first and second embodiments, transform coefficients are directly entropy-encoded upon encoding. Alternatively, quantization may be done prior to entropy encoding. In this case, dequantization is done after entropy decoding in the decoding process.

[Third Embodiment]

An image processing system according to the third embodiment of the present invention will be described below.

Since the schematic arrangement and functions of the image processing system according to this embodiment are basically the same as those described in the first embodiment using FIG. 1, a repetitive description thereof will be avoided.

In this embodiment, the encoding device 2 and decoding device 6 have different internal arrangements from those in the first embodiment. Hence, these differences will be mainly explained below.

Figure 13:
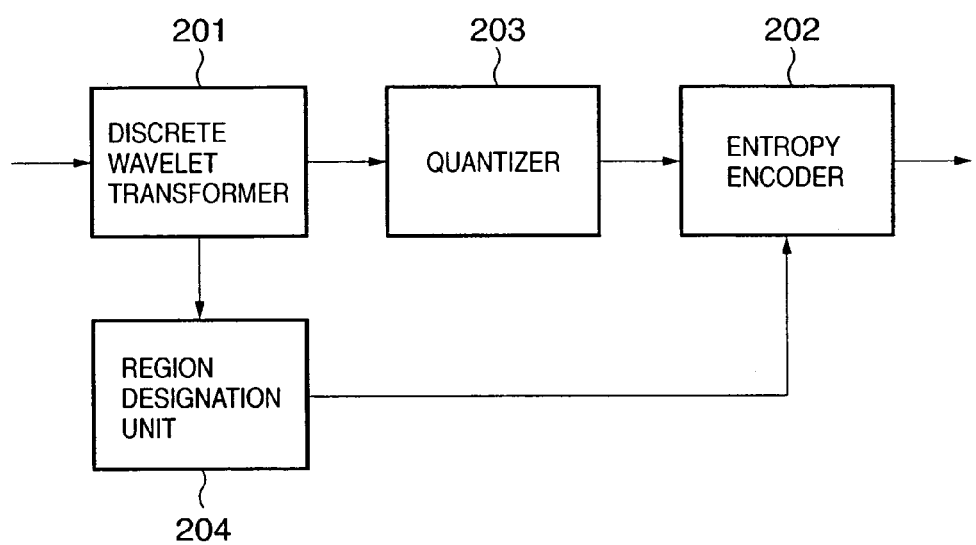
FIG. 13 is a block diagram showing an internal arrangement of an encoding device according to the third embodiment of the present invention.

FIG. 13 shows an internal arrangement of the encoding device 2 according to this embodiment. An image signal input to the encoding device 2 undergoes discrete wavelet transformation in the discrete wavelet transformer 201 as in the first embodiment to generate transform coefficients. The generated transform coefficients are input to and quantized by a quantizer 203, and the obtained quantization indices are encoded by the entropy encoder 202. The operations of the respective units will be explained below.

Since the discrete wavelet transformer 201 has the same arrangement and functions as those described in the first embodiment using FIG. 3, a description thereof will be omitted.

The quantizer 203 quantizes the input coefficients by a predetermined quantization step, and outputs indices (quantization indices) corresponding to the quantized values. In this case, quantization is described by:

$$q = \text{sign}(c)\text{floor}(\text{abs}(c)/\Delta) \tag{10}$$

$$\text{sign}(c)=1; \ c \geq 0 \tag{11}$$

$$\text{sign}(c)=-1; \ c<0 \tag{12}$$

where q is the quantization index, c is a coefficient to be quantized, and Δ is the quantization step. In this embodiment, the value Δ includes "1" and, in this case, no quantization is done in practice. The obtained quantization indices are output to the entropy encoder 202.

Figure 14A:
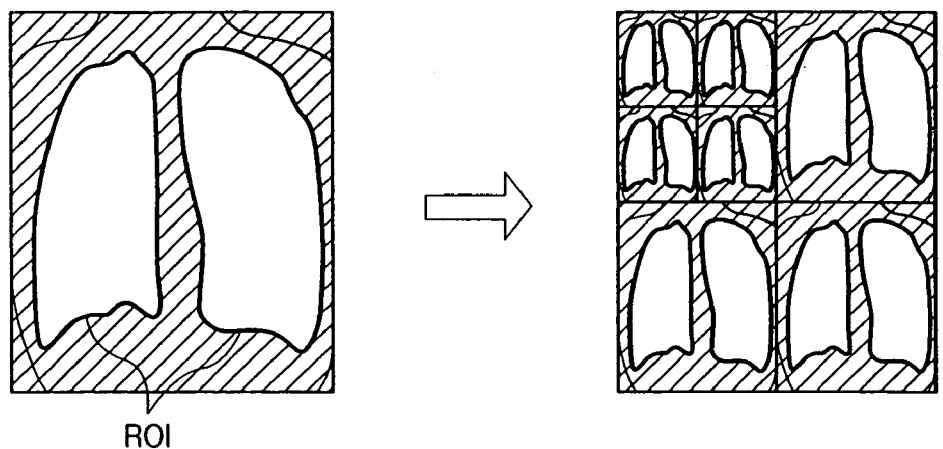
FIG. 14A shows an example of a mask generation method according to the third embodiment of the present invention.

The region designation unit 204 determines an ROI (Region Of Interest) in an image to be encoded, and generates mask information indicating coefficients that belong to the ROI upon computing the discrete wavelet transforms of the input image. In this embodiment, a region defined by coefficients equal to or higher than a predetermined value of those in an LL subband in the subband structure shown in FIG. 3C in the first embodiment is determined as the ROI. The left side in FIG. 14A shows an example in case of a chest image. In this case, lung portions (regions) having high luminance level are selected as ROIs.

Furthermore, FIG. 14A shows an example upon generating a mark. When the ROIs are designated, shown in the left side in FIG. 14A, the region designation unit 204 computes portions where the designated ROIs are included in respective subbands upon computing the discrete wavelet transforms of the image including these designated ROIs. Assume that mask information bits in each ROI are "1", and other mask information bits are "0". Note that the region indicated by this mask information corresponds to a range including transform coefficients of the surrounding region required for reconstructing an image signal on the boundary of each designated ROI. Since the position of each mask information corresponds to that of a transform coefficient obtained by two-dimensional discrete wavelet transformation, whether or not a coefficient at a given position belongs to the designated ROI can be identified by checking the corresponding bit in the mask information. The mask information generated in this way is outputted to the entropy encoder 202.

Figure 14B:
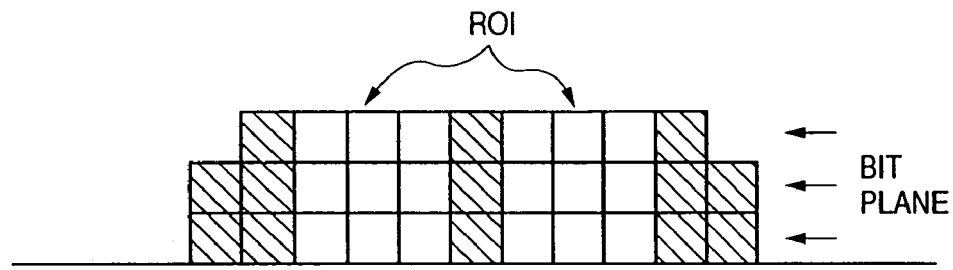
FIG. 14B shows quantization indices before a shift-up process.
Figure 14C:
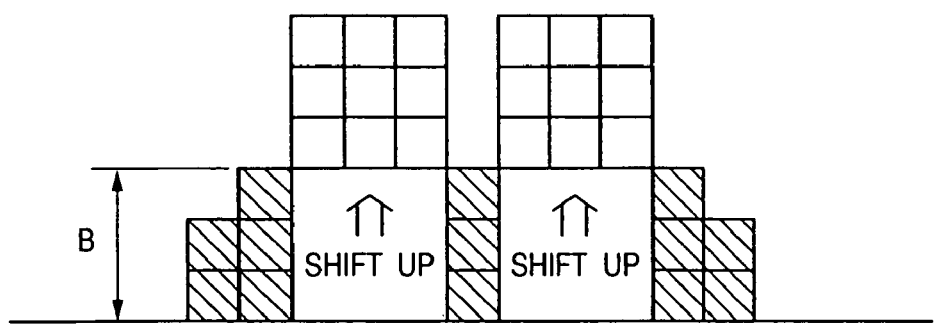
FIG. 14C shows quantization indices after the shift-up process.

If bit planes shown in, e.g., FIG. 14B are obtained when the entropy encoder 202 operates normally, bit planes of quantization indices which belong to the ROIs are shifted up (i.e., to the MSB side), as shown in FIG. 14C.

That is, FIGS. 14B and 14C show a change in quantization indices by the shift-up process. In FIG. 14B, a total of six quantization indices that belong to the ROIs are present, and quantization indices after the shift-up process are as shown in FIG. 14C.

In this manner, all bit planes of the ROIs in a given subband do not overlap those of quantization indices of a non-ROI region.

More specifically, the entropy encoder 202 computes a shift value B therefor. Furthermore, the entropy encoder 202 changes quantization indices based on the mask information input from the region designation unit 204 by:

$$q' = q \times 2^B; \ m=1 \tag{13}$$

$$q' = q; \ m=0 \tag{14}$$

where m is the mask value at the position of the quantization index of interest.

With the aforementioned process, only the quantization indices which belong to the ROIs designated by the region designation unit 204 are shifted up by B bits and, after that, the entropy encoder 202 encodes in units of bit planes.

The entropy encoder 202 decomposes the quantization indices into bit planes in units of rectangular regions (to be referred to as code blocks hereinafter) obtained by segmenting a subband into a predetermined size in correspondence with the input quantization indices, and makes binary arithmetic coding in units of bit planes, thus outputting bitstreams.

Figure 15A:
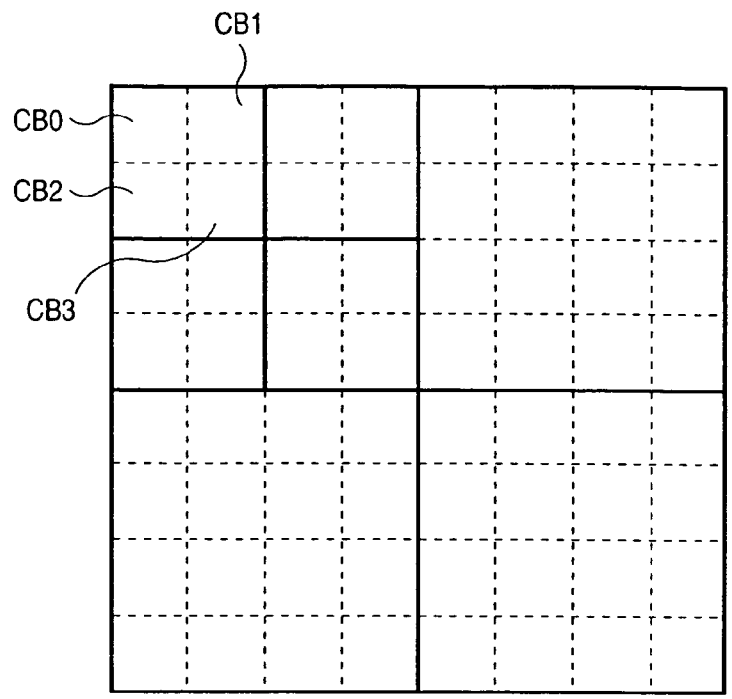
FIG. 15A shows subbands broken up into code blocks CB according to the third embodiment of the present invention.

FIG. 15A shows subbands broken up into code blocks CB. In FIG. 15A, for example, an LL subband is broken up into four code blocks CB0 to CB3, and quantization indices in these code blocks are encoded in units of bit planes in the order of CB0, CB1, CB2, and CB3.

The entropy encoder 202 scans the entire subband to obtain a maximum value M, and computes the number S of bits required to express a quantization index indicating the maximum value M as in the first embodiment. Furthermore, the entropy encoder 202 similarly computes the maximum number SB of bits from a maximum quantization index value in each code block.

Figure 15B:
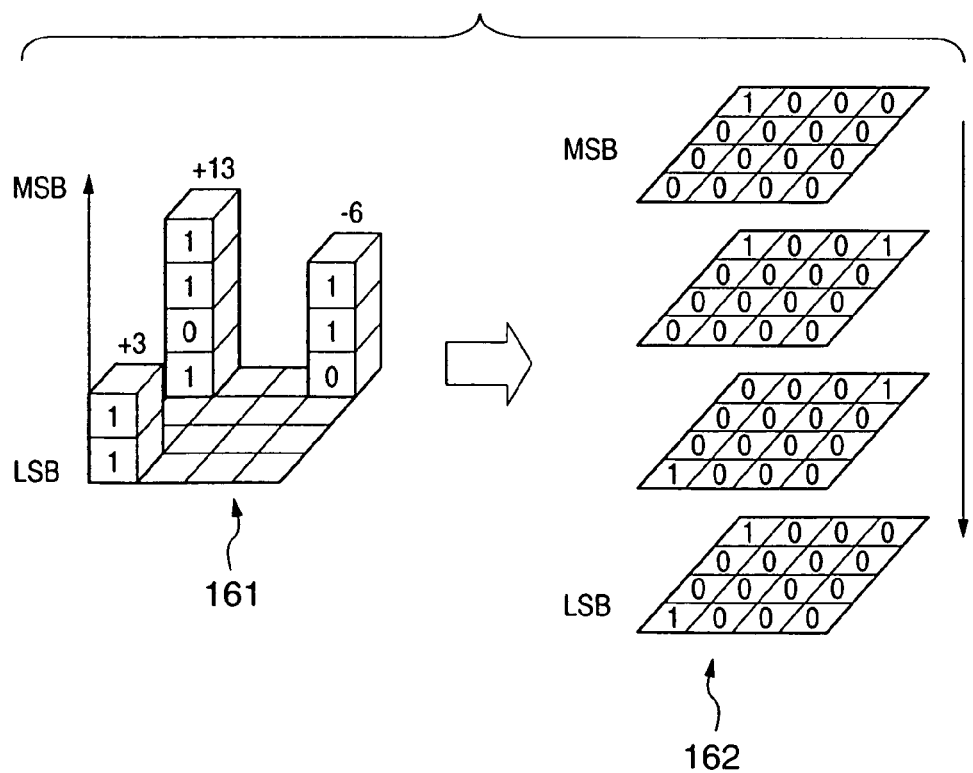
FIG. 15B is a view for explaining a bit plane encoding process in an entropy encoder.

FIG. 15B is a view for explaining an operation of bit plane encoding in the entropy encoder 202. FIG. 15B exemplifies a 4×4 subband region which includes three nonzero quantization indices (+13, −6, +3). The entropy encoder 202 scans the entire code block to obtain a maximum value MB, and computes the number SB of bits required for expressing a maximum quantization index by:

$$SB = \text{ceil}(\log_2(\text{abs}(MB))) \tag{15}$$

In 161 of FIG. 15B, since the maximum coefficient value MB is "13", equation (15) yields SB=4. Therefore, 16 quantization indices in the code block are decomposed into four bit planes, as indicated by 162. The entropy encoder 202 executes a stream process in units of those bit planes. The encoder 202 makes binary arithmetic coding of bits of the most significant bit plane (MSB) first, and outputs the coding result as a bitstream. Then, the encoder 202 lowers the bit plane by one level, and encodes bits of each bit plane to output a bitstream until the bit plane of interest reaches the least significant bit plane (LSB). At this time, a sign of each transform coefficient is entropy-encoded immediately after the first nonzero bit is detected in the bit plane.

Note that each bit plane undergoes a one-pass process, but may undergo processes in a plurality of passes.

In the aforementioned quantization index encoding process, the entropy encoder 202 shifts up quantization index values that belong to the ROIs by B bits, and then encodes in turn from the MSB bit plane. In this manner, bits of quantization indices of the ROIs occupy the former half of encoded data in each code block.

FIGS. 16A to 16D show the format of the code sequence which is generated and outputted in this way. FIG. 16A shows an overall format of a code sequence, in which MH is a main header; TH, a tile header; and BS, a bitstream. As shown in FIG. 16B, the main header MH is comprised of the size (the numbers of pixels in the horizontal and vertical directions) of an image to be encoded, a size upon breaking up the image into tiles as a plurality of rectangular regions, the number of components indicating the number of color components, the size of each component, and component information indicating bit precision. In this embodiment, since an image is not broken up into tiles, the tile size is equal to the image size. When the image to be encoded is a monochrome multi-valued image, the number of components is "1".

FIG. 16C shows a format of the tile header TH. The tile header TH consists of a tile length including the bitstream length and header length of the tile of interest, an encoding parameter for the tile of interest, and the bit shift value of each subband for quantization indices that belong to the designated ROI. The encoding parameter includes a discrete wavelet transform level, the number S of maximum bit planes of each subband, and the like.

FIG. 16D shows a format of the bitstream in this embodiment. As shown in the upper column in FIG. 16D, a bitstream is formed in units of subbands, which are arranged in ascending order of resolution to have a subband with the lowest resolution at the head position. Furthermore, in each subband, as shown in the middle column of FIG. 16D, codes are arranged in units of bit planes in the order from the upper to lower bit planes.

Furthermore, the codes of each bit plane are set in units of code blocks, as shown in the lower column in FIG. 16D, and PH contains the number SB of bits of a maximum bit plane of each code block, the difference from the number S of bits of the corresponding bit plane, information indicating that no significant code sequence is contained (e.g., quantization indices in each code block are all "0"s), and the like.

Note that data of bits equal to or larger than the number SB of bits of a code block (the number SB of bits), the number of bits of which is less than S, are processed as zero.

The code sequence formed in this manner is outputted to the file output device 3.

The file output device 3 forms a file to be saved or transferred on the basis of the code sequence input from the encoding device 2, and various data input from the image input device 1, as in the first embodiment. Various data include the name of the patient to be sensed, image sensing date, X-ray dosage upon image sensing, and the like. These data are combined with the aforementioned code sequence, and are output to the storage/transfer device 4 as a single file. The storage/transfer device 4 stores the input file or outputs it to an external apparatus via, e.g., a network in accordance with the purpose intended.

The operation upon displaying an image in the decoding device of this embodiment will be explained below. An image file stored by the storage/transfer device 4 is read by the file input device 5 as in the first embodiment. The file input device 5 analyzes the input file and separates the file into an appended information part, and a code sequence generated by the encoding device 2, and outputs the code sequence to the decoding device 6 for a decoding process.

The internal arrangement of the decoding device 6 will be explained below. The functions of respective units will be explained first, and the overall operation of the decoding device 6 will then be explained.

Figure 17:
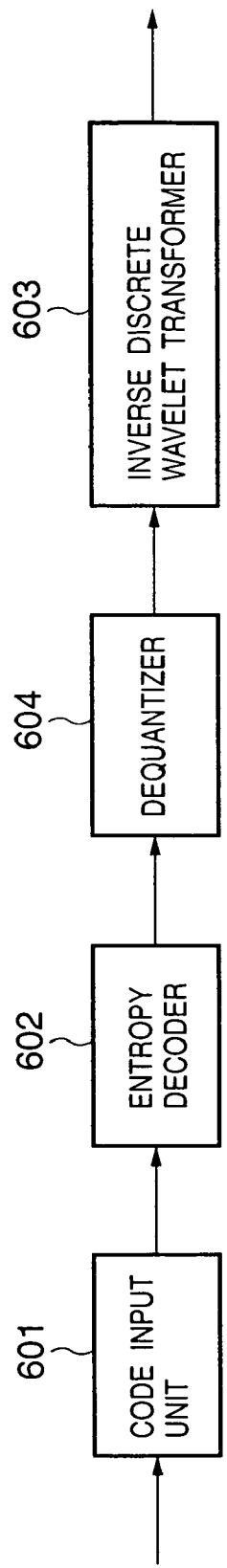
FIG. 17 is a block diagram showing an arrangement of a decoding device according to the third embodiment of the present invention.

FIG. 17 is a block diagram showing an arrangement of the decoding device 6. Reference numeral 601 denotes a code input unit; 602, an entropy decoder; 604, a dequantizer; and 603, an inverse discrete wavelet transformer.

Since the code input unit 601 has the same arrangement and functions as those in the first embodiment, a description thereof will be omitted.

Unlike in the first embodiment, the entropy decoder 602 according to this embodiment sets a lower-limit bit plane to be decoded upon decoding bit planes, and aborts a decoding process of bit planes below the lower-limit bit plane. After the lower-limit bit plane is decoded, restored quantization indices are shifted down (i.e., to the LSB side). That is, on the basis of the bit shift value B of the corresponding subband read out from the tile header TH, a quantization index that assumes a value exceeding $2B$ is shifted down by:

$$q = q'/2^B;\ q' \neq 0 \tag{16}$$

$$q = 0;\ q' = 0 \tag{17}$$

where q is the quantization index after the shift down process, q' is the quantization index before the shift down process, and B is the bit shift value read out from the tile header. With this process, the quantization indices which are shifted up, as shown in FIG. 14C, are shifted down, as shown in FIG. 14B. That is, the bit planes of the quantization indices of the ROI and non-ROI region are adjusted to those before the bit-shift process, and are output to the dequantizer 604.

In a dequantization process, the dequantizer 604 sets zero in bits contained in bit planes which are not decoded, and restores discrete wavelet transform coefficients by:

$$c' = \Delta \times q;\ q \neq 0 \tag{18}$$

$$c' = 0;\ q = 0 \tag{19}$$

where q is the quantization index, and $\Delta$ is the quantization step, which is the same value used upon encoding. c' is the restored discrete wavelet transform coefficient.

The inverse discrete wavelet transformer 603 executes the same two-dimensional inverse discrete wavelet transformation as that described in the first embodiment using FIG. 9 and equations (6) and (7). That is, the input transform coefficients undergo two filter processes of filters u and p, and are added to each other after being up-sampled, thus outputting an image signal x'. With the aforementioned processes, an image is reclaimed, and is outputted to and displayed on the image display device 7 which comprises a CRT, liquid crystal display, or the like.

Since the forward and inverse discrete wavelet transform processes given by equations (13), (14), (18), and (19) satisfy a perfect reconstruction condition, the restored image signal x' matches the original image signal x as long as the quantization step $\Delta$ is "1" and all bit planes are decoded in bit plane decoding in this embodiment.

Figure 18:
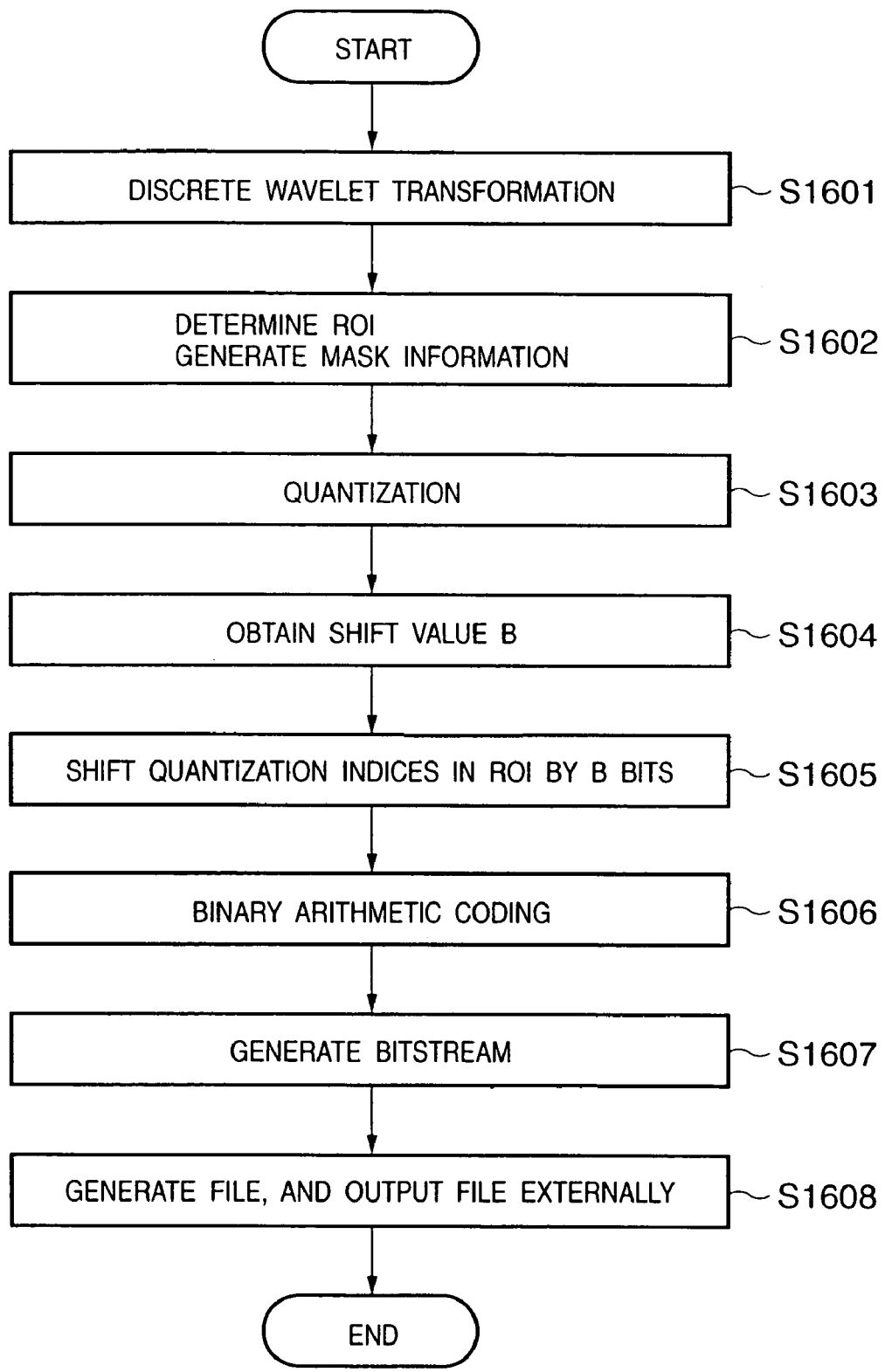
FIG. 18 is a flow chart showing an image encoding process in the encoding device according to the third embodiment of the present invention.
Figure 19:
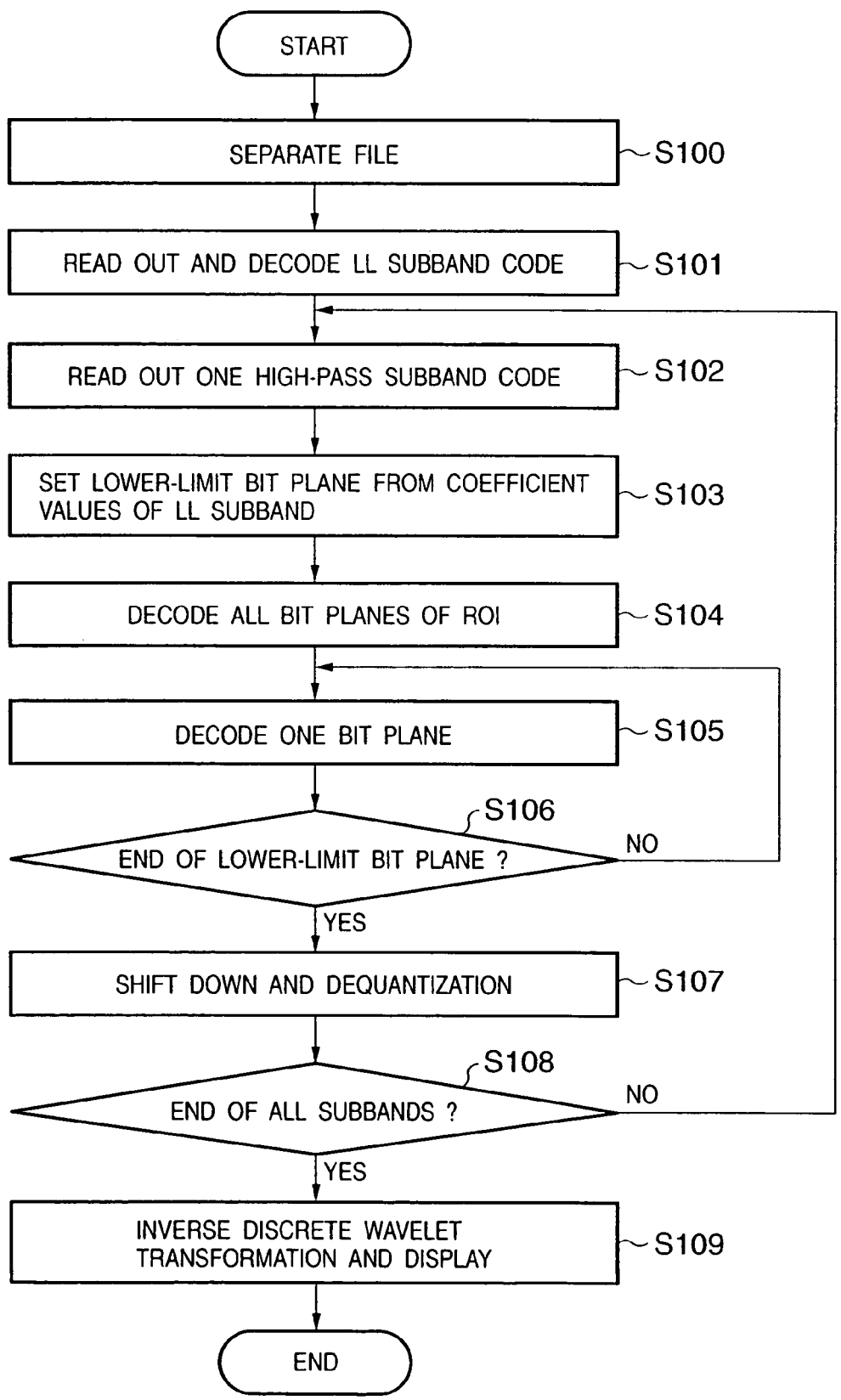
FIG. 19 is a flow chart showing an image decoding process done by the decoding device according to the third embodiment of the present invention.

FIGS. 18 and 19 are respectively flow charts which summarize the aforementioned image encoding and decoding processes in the encoding and decoding devices mentioned above. Note that program codes according to those flow charts are stored in memories such as ROMs, RAMs, or the like (not shown) in the encoding and decoding devices, and are read out and executed by a CPU (not shown).

The flow chart of the image encoding process shown in FIG. 18 will be described first.

The encoding device 2 generates discrete wavelet transformation of an image signal input from the image input device 1 (step S1601). The region designation unit 204 determines an ROI by the aforementioned method on the basis of coefficient values in an LL subband of those generated by the discrete wavelet transformation, and generates mask information indicating the ROI (step S1602).

All coefficients obtained in step S1601 are quantized by the quantizer 203 to generate quantization indices (step S1603). The entropy encoder 202 computes a shift value B of quantization indices by the method mentioned above (step S1604). The entropy encoder 202 specifies quantization indices within the ROI of those generated in step S1603 using the mask information generated in step S1602, and shifts the specified quantization indices within the ROI by the shift value B obtained in step S1604 (step S1605).

The quantization indices of each bit plane obtained as a result of the aforementioned process undergo binary arithmetic coding in units of code blocks (step S1606). A bitstream shown in FIG. 16 is generated using a code sequence obtained by this coding, and various headers mentioned above (step S1607). The file output device 3 generates a file using the bitstream and the aforementioned information from the image input device 1, and the storage/transfer device 4 outputs the file externally (to, e.g., the file input device 5) (step S1608). The output destination of the file in step S1608 is not limited to an external device. For example, the file may be output to and stored in a predetermined memory (not shown) in the encoding device. Note that this predetermined memory (not shown) may be the storage/transfer device 4 in FIG. 1.

The flow chart of the image decoding process in the decoding device shown in FIG. 19 will be explained below.

The file input device 5 separates the input file into a code sequence contained therein, and the information appended by the file output device 3 (step S100). The decoding device 6 reads out only codes corresponding to the LL subband from the code sequence, decodes and dequantizes these codes to restore coefficients of the LL subband, and stores the coefficients in a memory (not shown) (step S101).

The decoding device 6 then reads out a code sequence corresponding to one subband from the subsequent code sequence (step S102). This subband is one of those containing high-pass coefficients other than LL.

The decoding device 6 sets and stores a lower-limit bit plane, which is used to decode discrete wavelet transform coefficients belonging to a non-ROI region, on the basis of the coefficients of the LL subband stored in the memory (not shown) (step S103). In the method of setting the lower-limit bit plane position, for example, the average value of the coefficient values in the LL subband is used.

Figure 20A:
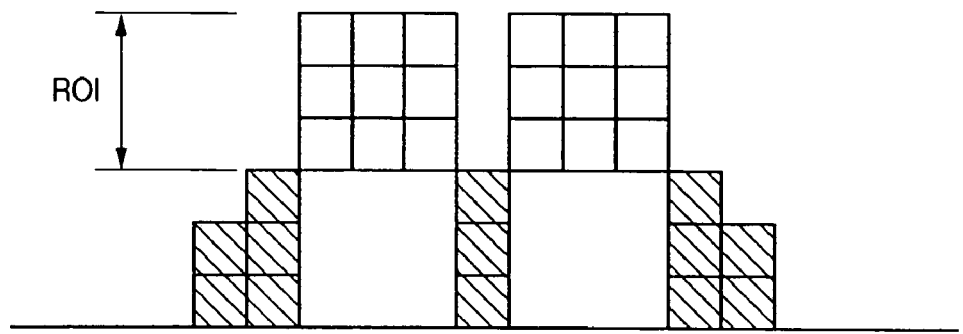
FIG. 20A shows quantization indices before a shift-down process according to the third embodiment of the present invention.

The entropy decoder 602 decodes all bit planes of quantization indices which are contained in the code sequence of the subband read in step S102 and belong to the ROI (step S104). That is, the decoder 602 reclaims quantization indices contained in the ROI from the code sequence of the subband read in step S102. In this way, portions indicated by the ROI in FIG. 20A are decoded.

Furthermore, the entropy decoder 602 decodes codes corresponding to one bit plane of quantization indices that belong to the non-ROI region so as to reconstruct that bit plane (step S105).

Figure 20B:
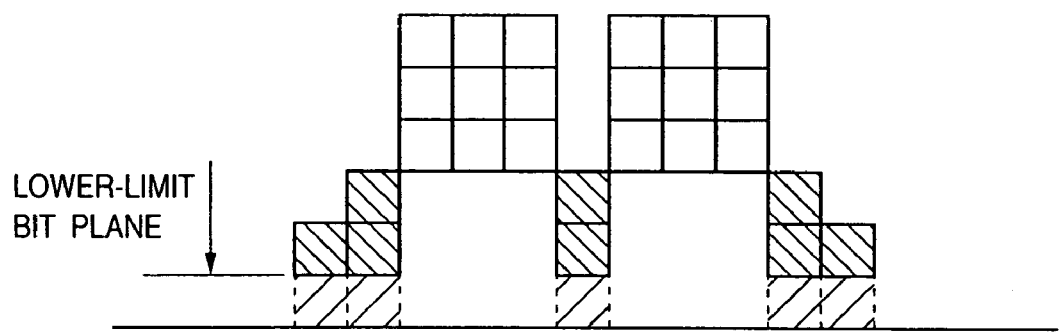
FIG. 20B shows quantization indices in consideration of a lower-limit bit plane.

It is checked if the bit plane reconstructed in step S105 is the lower-limit bit plane determined in step S103 (step S106). If the reconstructed bit plane is the lower-limit bit plane, the flow advances to step S107; otherwise, the flow returns to step S105 to proceed with a decoding process of the next lower bit plane. That is, as shown in FIG. 20B, the decoder 602 decodes bit planes from the most significant bit plane (MSB) to the lower-limit bit plane.

Upon checking in step S106 if the bit plane reconstructed in step S105 is the lower-limit bit plane, the number that specifies the lower-limit bit plane (e.g., the number indicating the order of bit plane from the MSB) is stored in step S103. Then, a variable, which has been reset to zero before the process according to this flow chart, is incremented by 1 every time the aforementioned decoding process is done in step S105, and the checking process in step S106 is attained by comparing this variable and the number stored in step S103.

Figure 20C:
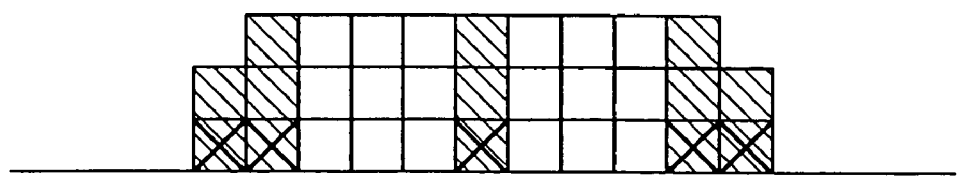
FIG. 20C shows quantization indices after the shift-down process.

Then, quantization indices, the values of which are larger than $2^B$ (those within the ROI), are shifted down by B bits, and after the shift process, the dequantizer 604 dequantizes all the quantization indices (step S107). At this time, dequantization is done while setting zero in non-decoded bits in quantization indices that belong to the non-ROI region. FIG. 20C shows quantization indices after the shift-down process by B bits. Bits with x marks in quantization indices of the non-ROI region in FIG. 20C are not decoded and are forcibly set at zero.

It is then checked if a decoding process for all subbands is complete (step S108). If subbands to be processed still remain, the flow returns to step S102 to execute the processes in step S102 and the subsequent steps for an unprocessed subband.

The inverse discrete wavelet transformer 603 computes the inverse discrete wavelet transforms of the transform coefficients obtained by dequantization to reclaim an image, and outputs it to the image display device 7 (step S109). As a result, the original image is reconstructed, and is displayed on the image display device 7.

In this way, all quantization indices of the ROI set upon encoding are perfectly restored, but lower bits of the non-ROI region are discarded. Hence, discrete wavelet transform coefficient values corresponding to fine variations are removed. Therefore, when a sensed image contains noise, an image from which fine noise components are removed can be obtained by appropriately selecting bit planes to be restored upon decoding.

In this embodiment, the ROI is set based on the coefficient values of the LL subband upon encoding. In addition, when a low-luminance region with many quantization noise components is determined from coefficient values and is set to be a non-ROI region, a higher noise removal effect can be obtained.

In this embodiment, the coefficient values of the LL subband are referred to upon determining the lower-limit bit plane of decoding. Alternatively, the X-ray dosage upon image sensing may be contained as a parameter in the code sequence, and the lower-limit bit plane of decoding may be determined based on that parameter.

[Fourth Embodiment]

An image processing system according to the fourth embodiment of the present invention will be explained below.

In the third embodiment, the shift value B is determined for quantization indices of the ROI upon decoding an image, so as to completely separate that bit plane from quantization indices of the non-ROI region. Alternatively, the bit shift value B may be determined by another method. Since the arrangement and functions of the overall system are substantially the same as those in the third embodiment, differences from the third embodiment will be explained in this embodiment.

FIG. 21 shows a state wherein the entropy encoder 202 in this embodiment executes a bit-shift process of quantization indices of the ROI. In FIG. 21, the quantization indices of the ROI are shifted up by B bits. Unlike in the third embodiment, bit planes of the quantization indices of the ROI overlap those of the quantization indices of the non-ROI region. In this embodiment, the shift value B is selected based on a noise level determined from the coefficients of the LL subband. That is, if E represents the noise level, B that satisfies:

$$B = \text{ceil}(\log_2(\epsilon)) \quad (20)$$

is selected. Furthermore, the lower-limit bit plane is the one B bits upper than the least significant bit plane (LSB). In this way, the shift value B and the lower limit position of the bit planes to be decoded can be simultaneously adjusted in correspondence with the noise level. Note that the noise level E can be calculated by a known method.

After the quantization indices are shifted based on the shift value B given by equation (20), encoding is done in the same manner as in the third embodiment.

Figure 22:
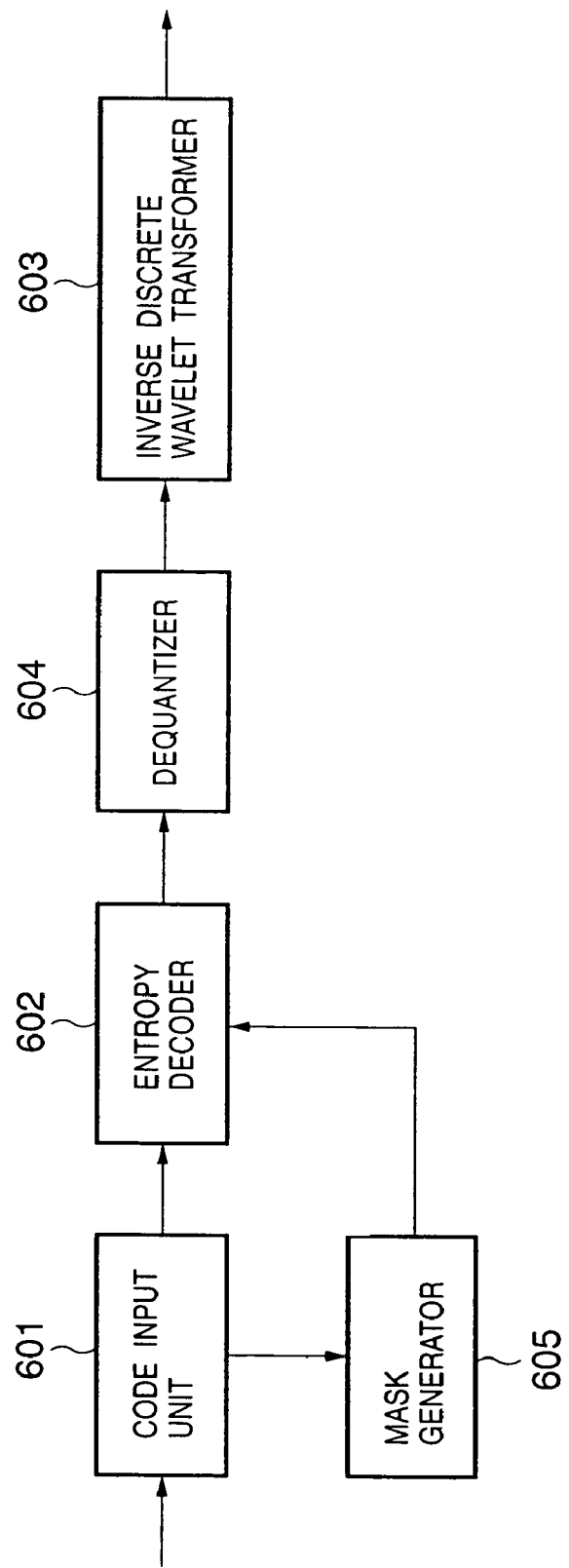
FIG. 22 is a block diagram showing an arrangement of a decoding device according to the fourth embodiment of the present invention.

FIG. 22 shows an arrangement of the decoding device 6. The code input unit 601 outputs shape data of the aforementioned ROI extracted from the input code sequence to a mask generator 605. The mask generator 605 generates a mask that represents coefficients which belong to the ROI in each subband, and outputs that mask to the entropy decoder 602.

Figure 23:
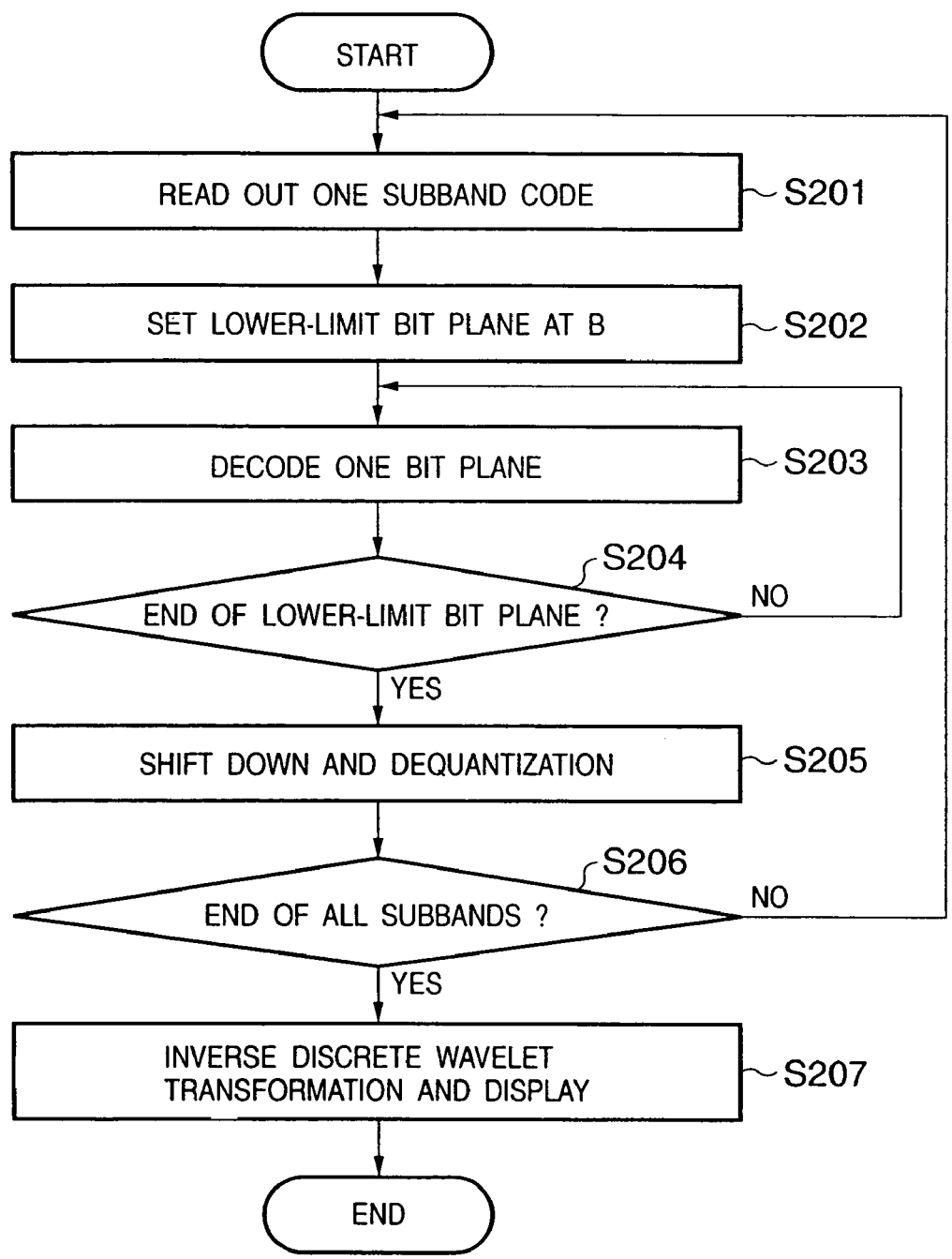
FIG. 23 is a flow chart showing a flow of operation of the decoding device according to the fourth embodiment of the present invention.

The flow of the operation of the decoding device 6 in this embodiment will be described below with reference to the flow chart in FIG. 23.

The decoding device 6 reads out a code sequence corresponding to one subband from the subsequent code sequence (step S201). Then, the lower-limit bit plane of decoding in the entropy decoding process is set to be the bit shift value B contained in the code sequence (step S202).

Codes corresponding to one bit plane of quantization are decoded to restore that bit plane (step S203). It is checked if the bit plane restored in step S203 is the lower-limit bit plane determined in the previous step (step S204). If the restored bit plane is the lower-limit bit plane, the flow advances to step S205; otherwise, the flow returns to step S203 to proceed with the process for the next lower bit plane.

The quantization indices that belong to the ROI are shifted down by B bits with reference to the mask input from the mask generator 605, and dequantization is executed (step S205). At this time, all bits contained in non-decoded bit planes in quantization indices that belong to the non-ROI region (bits contained in bit planes contained in the non-ROI region) are set at zero. FIG. 20C shows the quantization indices after the shift down process, and bits with x marks in quantization indices of the non-ROI region in FIG. 20C are not decoded and are forcibly set at zero.

It is then checked if a process for all the subbands is complete (step S206). If subbands to be processed still remain, the flow returns to step S201 to process the next subband. The inverse discrete wavelet transforms of the obtained transform coefficients are computed to reconstruct an image, which is outputted to the image display device 7.

In this embodiment, the shift value B is computed in correspondence with a noise level, and that shift value B directly determines the lower-limit bit plane. That is, since the bit plane of the ROI need only be shifted up to the lower-limit bit plane, a noise removal effect can be obtained by fewer processing steps.

In the third and fourth embodiments described above, the lower-limit bit plane is determined using the values of the LL subband. However, upon determining the lower-limit bit plane, a predetermined region may be determined in a predetermined high-frequency subband, a noise level is estimated based on variations of coefficient values in that region, and the lower-limit bit plane may be determined based on that level in place of the coefficient values of the LL subband.

Upon determining the shift value B upon encoding in this embodiment, the X-ray dosage upon image sensing may be directly used. Furthermore, data that represents the shape of the ROI may be contained in the code sequence.

[Fifth Embodiment]

An image processing system according to the fifth embodiment of the present invention will be described below.

In the third embodiment, the ROI is set, and only noise components of the non-ROI region are removed. However, in this embodiment, the number of bit planes to be encoded in an image encoding process is controlled to implement a noise removal process without setting any ROI.

Figure 24:
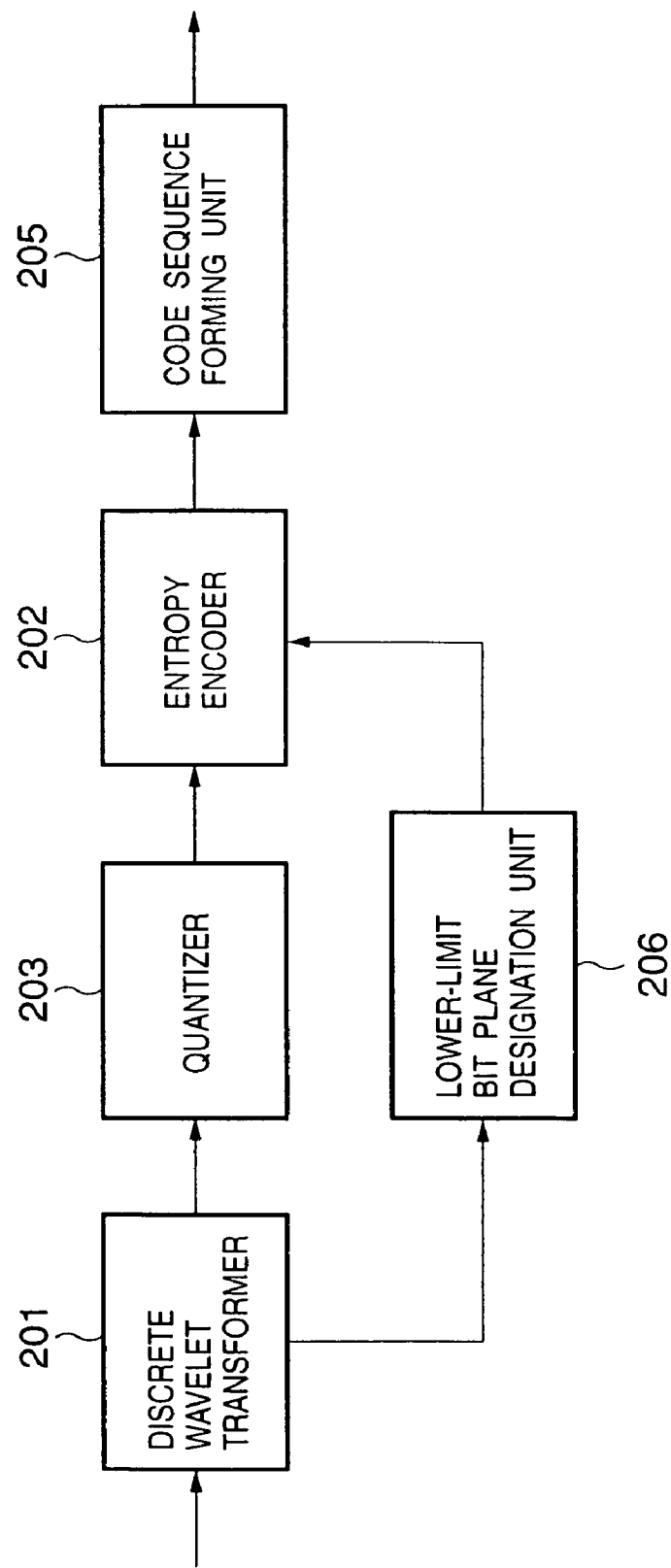
FIG. 24 is a block diagram showing an arrangement of an encoding device according to the fifth embodiment of the present invention.

Since the arrangement of the image processing system in this embodiment is substantially the same as that of the image processing system of the third embodiment except for the internal arrangement of the encoding device 2, the internal arrangement and functions of the encoding device 2 will be explained below, and a description of other arrangements will be omitted. FIG. 24 shows an arrangement of the encoding device 2 in this embodiment.

In the encoding device 2 according to this embodiment, a lower-bit plane designation unit 206 is provided in place of the region designation unit 204, and a code sequence forming unit 205 is added, unlike in the arrangement of the encoding device 2 of the third embodiment shown in FIG. 13. Other units (201, 202, and 203) perform the same processes as those in the third embodiment.

Referring to FIG. 24, the lower-limit plane designation unit 206 stores data of the LL subband input from the discrete wavelet transformer 201 in a memory (not shown). The lower-limit plane designation unit 206 obtains a lower-limit bit plane on the basis of the input coefficients of the LL subband, and the entropy encoder 202 performs bit plane encoding of code blocks using that lower-limit bit plane.

Figure 25:
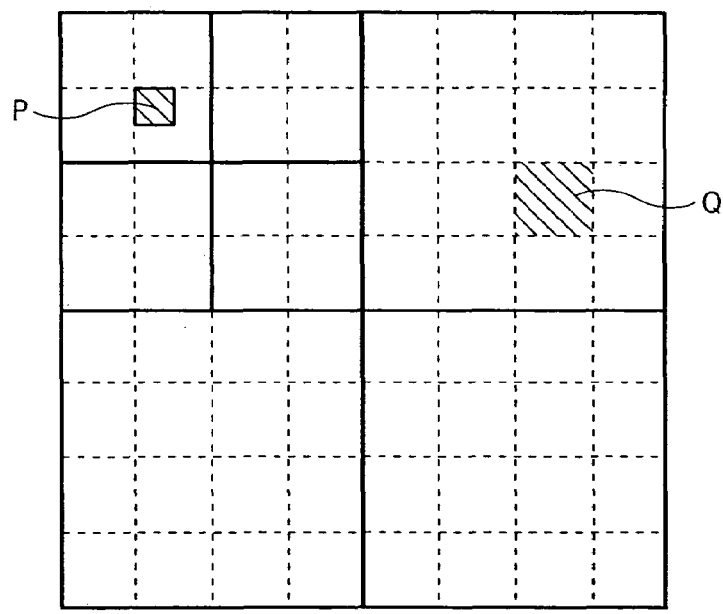
FIG. 25 shows the relationship between an LL subband and a code block used to obtain a lower-limit bit plane.

FIG. 25 shows the relationship between the LL subband and a code block used to obtain the lower-limit bit plane in a transform coefficient group obtained upon computing the discrete wavelet transforms of two levels. In FIG. 25, Q indicates a code block used to obtain the lower-limit bit plane, and P indicates a coefficient region of the LL subband corresponding to Q.

Since the subband structure generated by discrete wavelet transformation according to this embodiment is obtained by recursively segmenting a low-frequency range with a resolution=½, which is obtained by decomposition of one level, a coordinate value indicating the position of a coefficient corresponding to Q can be multiplied by the number of levels upon decomposing ½ so as to obtain P from Q. The lower-limit bit plane designation unit 206 obtains the average value of coefficient values C(i,j) that belong to P, and computes a lower-limit bit plane BL of a code block B by:

$$BL = 0; \ \{\Sigma C(i,j)\}/N \geq Th \quad (21)$$

$$BL = m; \ \{\Sigma C(i,j)\}/N < Th \quad (22)$$

where C(i,j) is a coefficient value at the position (i,j) in a local coordinate system in P, and m and Th are respectively a predetermined lower-limit bit plane and threshold value. Also, Σ is an operator of a sum total arithmetic operation for i and j.

The lower-limit bit plane is computed for each code block, is outputted to the entropy encoder 202, and is stored in a memory (not shown). Note that lower-limit bit planes are set for high-frequency subbands except for LL, and all bit planes are to be encoded for LL. A decomposition level to which subbands to be encoded belong is determined in advance based on the characteristics of noise and the like. For example, when subbands belonging to level 1 are to be encoded, lower-limit bit planes are set for three subbands HL1, LH1, and HH1. That is, lower-limit bit planes are set for high-frequency subbands in a region where transform coefficients of a low-frequency range in an image are small.

After the lower-limit bit planes are set, bit planes of quantization indices generated upon quantizing the transform coefficients are encoded in turn from the MSB until the corresponding lower-limit bit plane is reached.

The code sequence forming unit 205 receives the code sequence generated by the entropy encoder 202, and forms a code sequence by appending predetermined header information and the like to that code sequence so as to output the input code sequence to the file output device 3. That is, the code sequence forming unit 205 performs some of processes of the file output device 3 described in the third embodiment.

Figure 26:
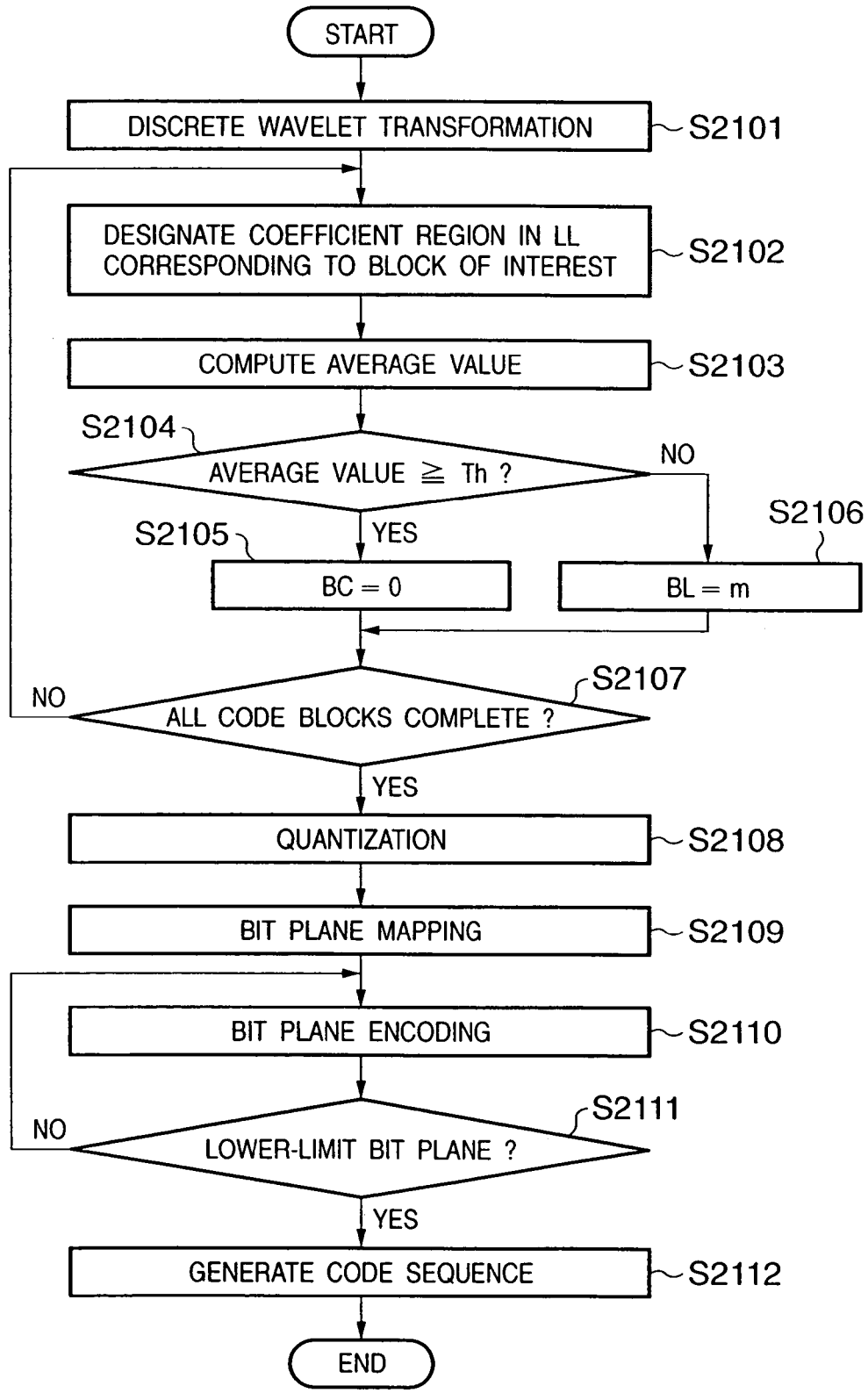
FIG. 26 is a flow chart of various processes done by the encoding device according to the fifth embodiment of the present invention.

The aforementioned processes in the encoding device will be briefly described below using the flow chart in FIG. 26.

The discrete wavelet transforms of an image signal are computed to generate transform coefficients (step S2101). One subband other than the LL subband is determined. For example, when an HL1 subband is selected, a corresponding coefficient region in the LL subband is specified in each code block in the HL1 subband (step S2102). The average value of transform coefficients in the coefficient region in the LL subband specified in step S2102 is computed (step S2103).

It is checked if this average value is equal to or larger than Th (step S2104). A lower-limit bit plane is set as described by equation (21) or (22) in accordance with the checking result (step S2105, step S2106).

It is checked if the processes in steps S2102 to S2106 have been executed for all code blocks (step S2107). If the processes have been executed for all code blocks, the flow advances to step S2108; otherwise, the flow returns to step S2102 to execute the aforementioned processes for an unprocessed code block.

The transform coefficients are quantized to generate quantization indices (step S2108), these quantization indices are mapped on bit planes (step S2109), and these bit planes are encoded up to the lower-limit bit plane position obtained for each code block (step S2110, step S2111). Then, the aforementioned code sequence is generated.

The decoding device 6 in this embodiment will be briefly described. The arrangement of this decoding device 6 is the same as that in the third embodiment, and the image decoding process is executed as follows. The entropy decoder 602 executes an entropy decoding process of encoded data of bit planes contained in the code sequence input via the code input unit 601, and the dequantizer 604 dequantizes quantization indices of the bit planes obtained by the decoding process so as to obtain transform coefficients of discrete wavelet transformation. The inverse discrete wavelet transformer 603 executes an inverse discrete wavelet transform process using these transform coefficients to reconstruct an image signal.

With the aforementioned processes, since predetermined bit planes of an image signal corresponding to a code block and the lower-limit bit plane which is set to be a value other than zero upon encoding, are ignored, signal components in the high-frequency range are consequently limited. Therefore, when an image signal contains quantization noise or the like, an image from which such noise is removed is obtained during the encoding process, and the compressed image can be transferred or stored.

Since encoding is aborted for bit planes which contain more noise components, compression efficiency drop, due to noise, can be prevented.

[Sixth Embodiment]

An image processing system according to the sixth embodiment of the present invention will be described below. In the third to fifth embodiments described above, bit planes of each code block are encoded sequentially to form a code sequence. However, in this embodiment, a layer from which bit planes containing noise are removed is encapsulated in the code sequence upon forming the code sequence.

Figure 27:
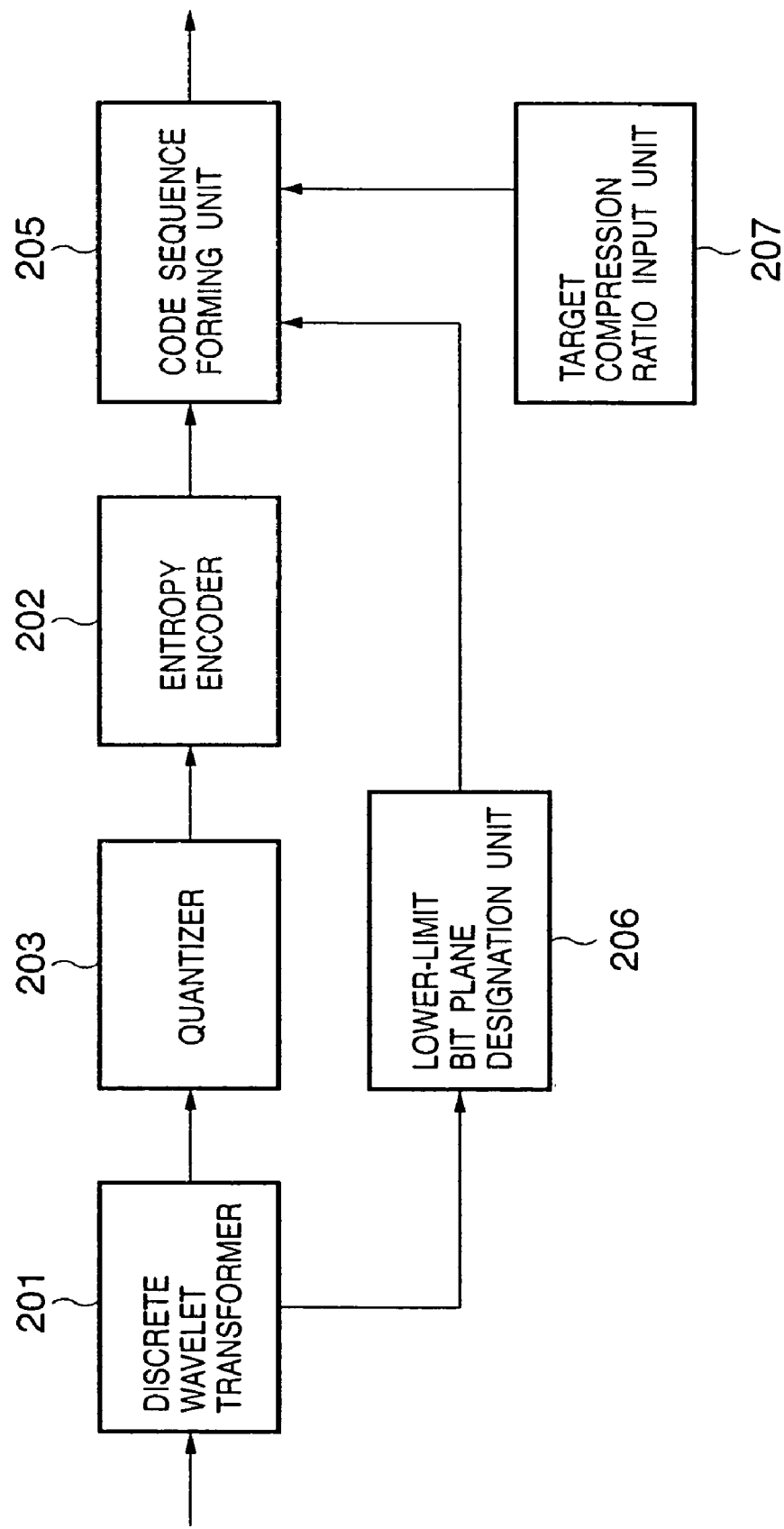
FIG. 27 is a block diagram showing an arrangement of an encoding device according to the sixth embodiment of the present invention.

Since the arrangement of the image processing system of this embodiment is substantially the same as that of the image processing system in the third embodiment except for the internal arrangement of the encoding device 2, the internal arrangement and functions of the encoding device 2 will be explained below, and a description of other arrangements will be omitted. FIG. 27 shows an arrangement of the encoding device 2 in this embodiment.

Referring to FIG. 27, reference numeral 207 denotes a target compression ratio input unit for inputting a target compression ratio. The arrangement other than the target compression ratio input unit 207 is the same as that in the fifth embodiment, and lower-limit bit planes in units of code blocks determined by the lower-limit bit plane designation unit 206 are output to the code sequence forming unit 205.

The code sequence forming unit 205 temporarily stores codes generated by the entropy encoder 202 in a buffer (not shown), and forms a code sequence which has a code size corresponding to the target compression ratio input from the target compression ratio input unit 207, and maximizes the image quality of an image reconstructed upon decoding.

Figure 28:
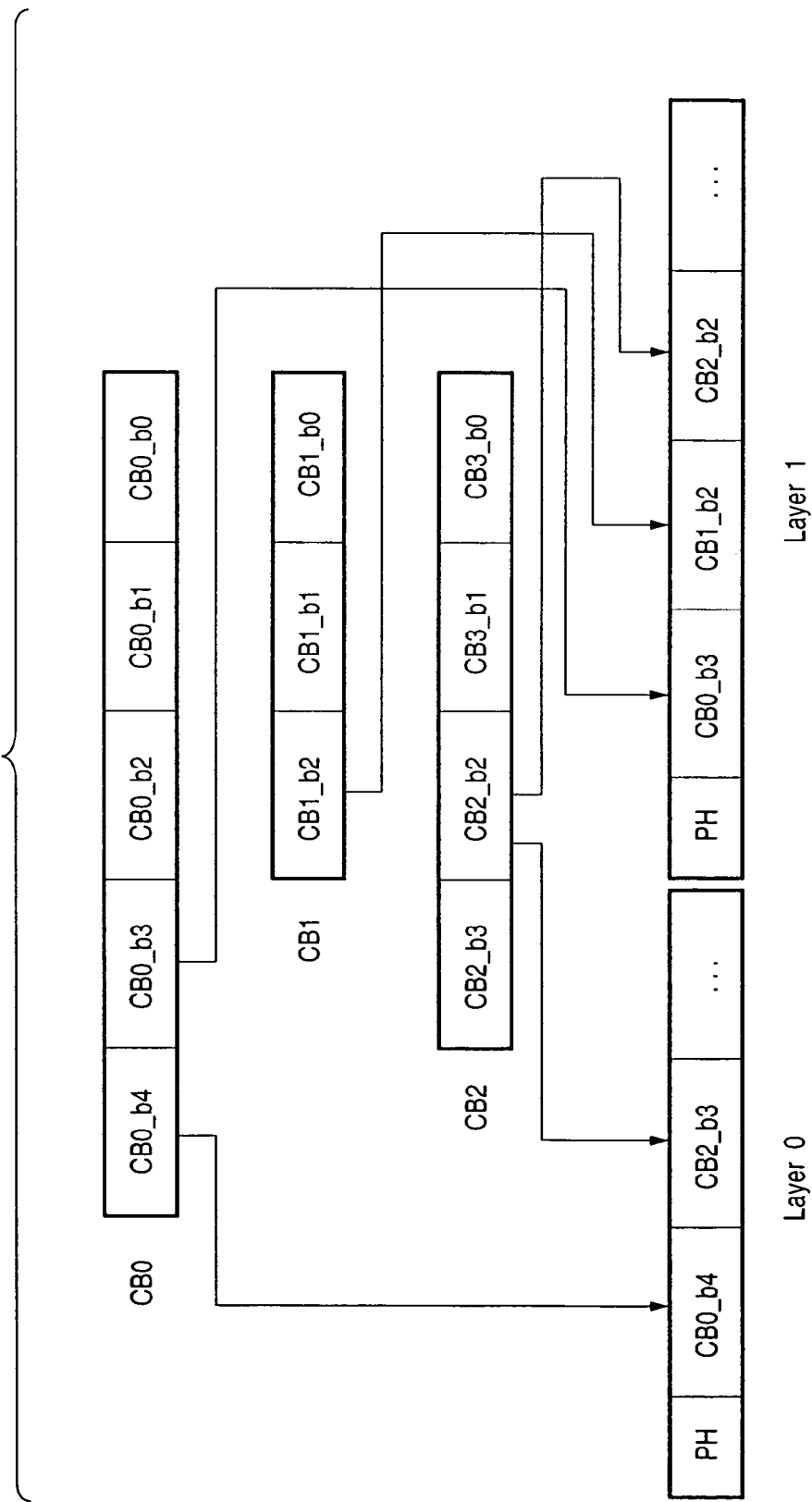
FIG. 28 shows the format of a code sequence generated by a code sequence forming unit according to the sixth embodiment of the present invention.

This state will be explained below with reference to FIG. 28. As shown in FIG. 28, a bitstream made up of code blocks CB0 to CB2 is stored in a memory in the code sequence forming unit 205, and code blocks CB0, CB1, and CB2 respectively have codes corresponding to five, three, and four bit planes. The code sequence forming unit 205 forms a layer by appropriately selecting bit planes from the code sequences of the stored code blocks.

The layer is formed by combining codes of a plurality of bit planes selected from a plurality of code blocks, as shown in FIG. 28. For example, layer 0 contains the most significant bit planes of CB0 and CB2, and layer 1 contains a bit plane of level 3 of CB0, a bit plane of level 2 of CB1, and a bit plane of level 2 of CB2. Bit planes and code blocks to be combined to form a layer are determined based on predetermined criteria.

Therefore, in FIG. 28 the code sequences of code blocks are not always formed in units of identical bit planes unlike those in FIG. 16. Information indicating code blocks included in a given layer is contained in the header PH.

Upon forming such code sequence, the code sequence forming unit 205 switches the code block selection method so as not to select code sequences corresponding to bit planes below the lower-limit bit plane in each layer with reference to the lower-limit bit planes in units of code blocks determined by the lower-limit bit plane designation unit 206.

Furthermore, the code sequence forming unit 205 adjusts the code sequence so that its final length satisfies the designated compression ratio. This adjustment can be implemented by cutting a code sequence of a lower layer.

According to the aforementioned method, the code sequence is formed to minimize distortion with respect to the designated compression ratio. But since lower-limit bit planes are set for specific code blocks and components corresponding to noise are not considered in distortion improvement, an image which has an improved image quality as a whole, and can suppress noise can be obtained upon decoding that code sequence.

Note that the target compression ratio input unit 207 may comprise a driver for computing the target compression ratio in addition to a keyboard, mouse, and the like. That is, a driver (not shown) may detect in advance a maximum storage capacity of a storage medium that stores the code sequence, and may input a target compression ratio computed based on the detected maximum storage capacity of the storage medium and the code sequence size to the code sequence forming unit 205.

According to the third to sixth embodiments, upon compressing, decoding, and displaying an image containing noise, noise can be removed without requiring any special noise removal process, and an image with high image quality can be generated.

[Seventh Embodiment]

An image processing system according to the seventh embodiment of the present invention will be described below. Since the arrangement of the image processing system in this embodiment is substantially the same as that of the image processing system of the first embodiment except for execution of quantization and the internal arrangement of the decoding device 6, the internal arrangement and functions of the decoding device 6 will be explained below, and a description of other arrangements will be omitted.

FIG. 29 shows a schematic arrangement of the encoding device 2. An image signal input to the encoding device 2 undergoes discrete wavelet transformation in the discrete wavelet transformer 201 to generate transform coefficients. The transform coefficients are quantized by the quantizer 203, and are encoded by the entropy encoder 202. The encoded data is input to the code sequence forming unit 205 to form a code sequence. Since the discrete wavelet transformer 201 has the same arrangement and functions as those described in the first embodiment, and the entropy encoder 202 and quantizer 203 have the same arrangements and functions as those described in the third embodiment, a description thereof will be omitted.

The code sequence forming unit 205 forms a code sequence by appending predetermined header information and the like so as to output input codes to the file output device 3.

FIGS. 30A to 30E show the format of the code sequence which is generated and outputted in this way. FIG. 30A shows an overall format of a code sequence, in which MH is a main header; TH, a tile header; and BS, a bitstream. As shown in FIG. 30B, the main header MH is comprised of the size (the numbers of pixels in the horizontal and vertical directions) of an image to be encoded, a size upon breaking up the image into tiles as a plurality of rectangular regions, the number of components indicating the number of color components, the size of each component, and component information indicating bit precision. In this embodiment, since an image is not broken up into tiles, the tile size is equal to the image size. When the image to be encoded is a monochrome multi-valued image, the number of components is "1".

FIG. 30C shows a format of the tile header TH. The tile header TH consists of a tile length including the bitstream length and header length of the tile of interest, and an encoding parameter for the tile of interest. The encoding parameter includes a discrete wavelet transform level, filter type, and the like.

FIG. 30D shows a format of the bitstream in this embodiment. In FIG. 30D, a bitstream is formed in units of subbands, which are arranged in ascending order of resolution to have a subband with the lowest resolution at the head position. Furthermore, in each subband, codes are arranged in units of bit planes in the order from the upper to lower bit planes.

Codes of each bit plane of the LL subband are arranged in units of code blocks, as shown in the second lowermost column of FIG. 30D, and PH contains the difference between a maximum bit plane SB of each code block and a corresponding bit plane S, information for designating code blocks contained in the bit plane of interest, and the like. In FIG. 30D, bit plane (s-1) contains codes of four code blocks (CB0_S-1, CB1_S-1, CB2_S-1, CB3_S-1), and PH can designate code blocks, the corresponding codes of which are not present in the bit plane of interest.

FIG. 30E shows an arrangement of bit plane codes of another subband. The code sequence generated in this way is outputted to the file output device.

In this embodiment, codes of each subband are formed in units of bit planes which are arranged in the order from the MSB to the LSB, but need not always be formed in units of bit planes. For example, a layer which combines encoded data corresponding to a predetermined number of bit planes from the most significant bit plane may be used as a unit.

In this case, PH contains information indicating the number of bit planes corresponding to the codes of the contained code blocks in addition to information indicating whether the code blocks are contained.

Upon adopting JPEG2000, each bit plane is encoded while being segmented into a plurality of passes. Encoded data contained in each layer may be arranged in units of passes. In this case, PH contains information indicating the number of passes of codes of the code blocks contained.

Figure 35:
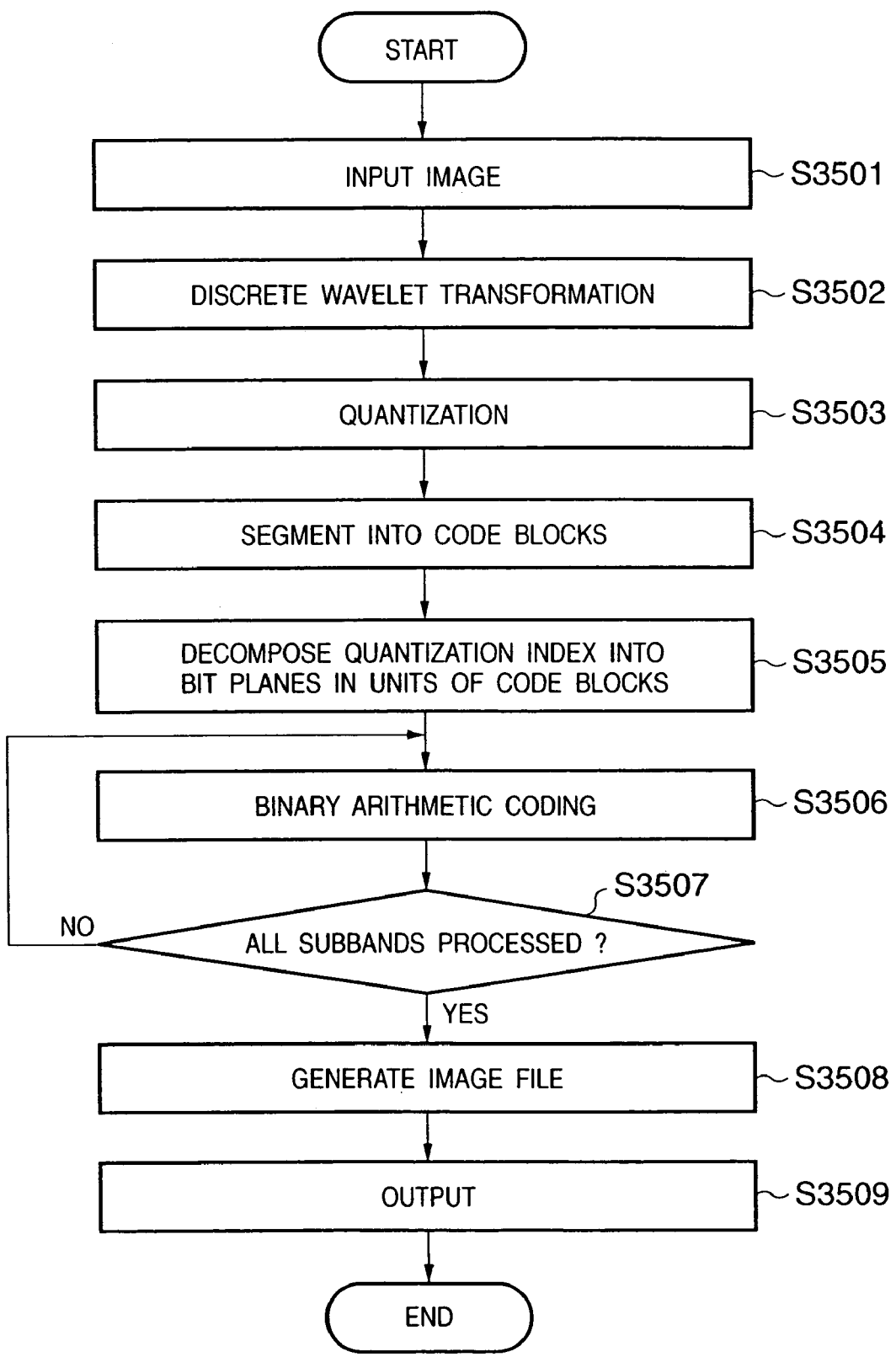
FIG. 35 is a flow chart showing an encoding process in an image processing system according to the seventh embodiment of the present invention.

FIG. 35 is a flow chart of a compression encoding process executed by the image processing system of this embodiment mentioned above, and the process will be described below.

An image is input (step S3501), undergoes discrete wavelet transformation (step S3502), and is then quantized (step S3503). Each subband is segmented into code blocks (step S3504), and quantization indices are decomposed into bit planes in units of code blocks (step S3505). The code blocks contained in all the subbands (step S3507) undergo binary arithmetic coding (step S3506), and the aforementioned header information is appended to the binary arithmetic coding result (code sequence) to generate an image file (step S3508). The image file is then output (step S3509).

The decoding process in the image processing system according to this embodiment will be described below. An image file stored by the storage/transfer device 4 is read by the file input device 5, and is separated into appended data appended by the file output device 3, and the code sequence generated by the encoding device 2. The code sequence is outputted to the decoding device 6 for a decoding process.

Figure 31:
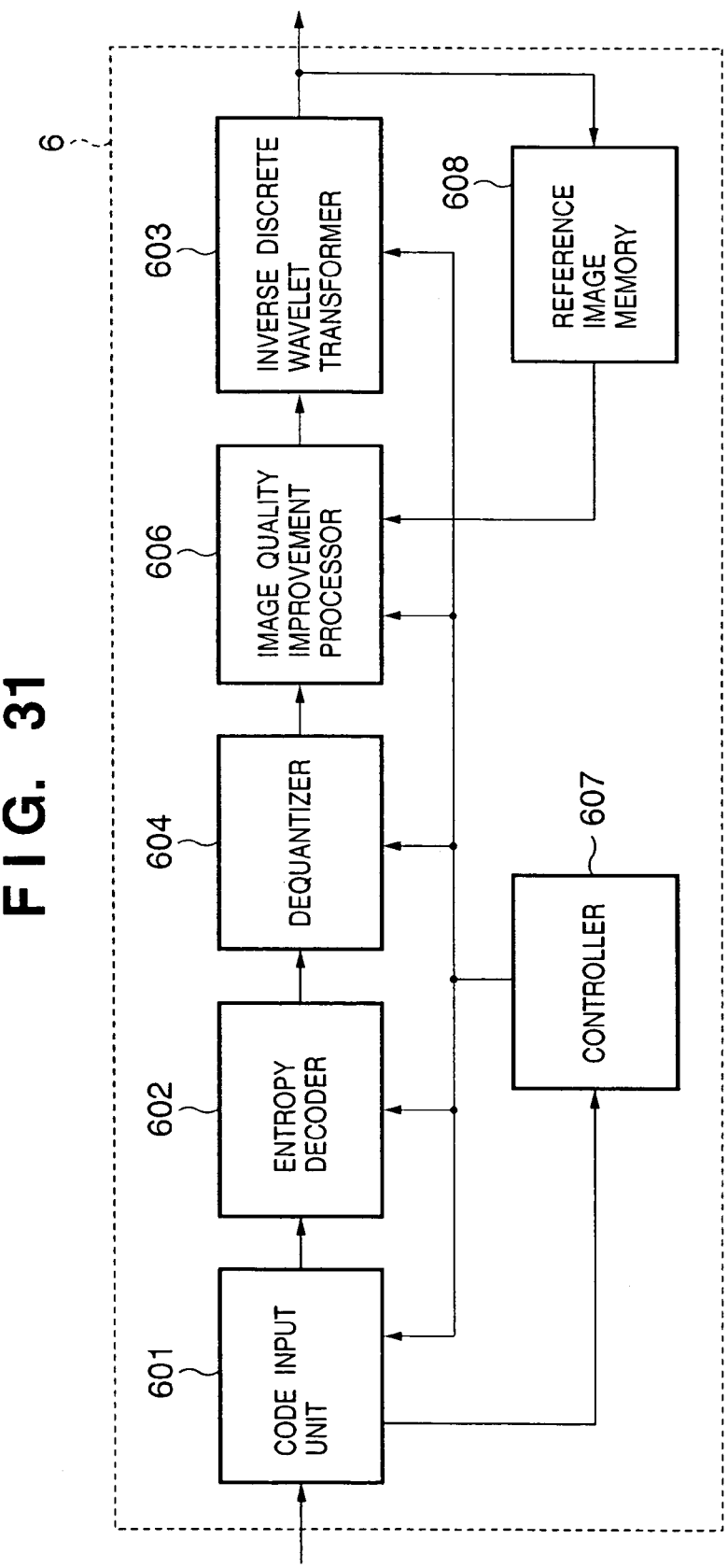
FIG. 31 is a block diagram showing an arrangement of a decoding device according to the seventh embodiment of the present invention.

FIG. 31 is a block diagram showing an arrangement of decoding device 6 of this embodiment. Reference numeral 601 denotes a code input unit; 602, an entropy decoder; 603, an inverse wavelet transformer; 604, a dequantizer; 606, an image quality improvement processor; 607, a controller; and 608, a reference image memory.

The code input unit 601 receives a code sequence, analyzes header information contained in that code sequence to extract parameters required for the subsequent processes, and sends the extracted parameters to the controller 607. Bitstreams contained in the code sequence are output to the entropy decoder 602.

The entropy decoder 602 decodes and outputs the bitstreams in units of bit planes.

The entropy decoder 602 decodes and outputs the bitstreams in units of bit planes as in the first embodiment described using FIG. 8.

The dequantizer 604 restores discrete wavelet transform coefficients c' from the input quantization indices in the same manner as in the third embodiment described using equations (18) and (19). The transform coefficients c' are output to the image quality improvement processor 606.

The image quality improvement processor 606 selects a pixel which is to undergo an image quality improvement process from those belonging to subbands other than an LL subband as a low-frequency subband on the basis of predetermined conditions, and performs a comparison process of a transform coefficient c' of the selected pixel with a predetermined threshold value T by:

$$cn=0;\ abs(c') \leq T \tag{23}$$

$$cn=c';\ abs(c') > T \tag{24}$$

Then, the processor 606 outputs the comparison result to the inverse discrete wavelet transformer 603.

The processed discrete wavelet transform coefficients cn are output to the inverse discrete wavelet transformer 603. Note that the threshold value T varies depending on the subband to which a coefficient to be processed belongs.

The inverse discrete wavelet transformer 603 computes the two-dimensional inverse discrete wavelet transforms of the input transform coefficients to reconstruct an image signal. The two-dimensional inverse discrete wavelet transform process is controlled by the controller 607.

The overall operation of the decoding device 6 will be explained. The controller 607 controls the code input unit 601 to input encoded data corresponding to a predetermined number of subbands of those contained in the code sequence shown in FIG. 30A. In this embodiment, encoded data corresponding to an LL subband in FIG. 30D are read.

The read encoded data corresponding to the LL subband are output to the entropy decoder 602 to undergo a decoding process, thus restoring quantization indices. Furthermore, the restored quantization indices are dequantized by the dequantizer 604 to restore transform coefficients that belong to the LL subband.

The restored LL subband coefficients are output to the image quality improvement processor 606. In this case, the controller 607 controls the image quality improvement processor 606 to directly output the input coefficients without any process. The LL subband coefficients output from the image quality improvement processor 606 in this way undergo inverse transformation in the inverse discrete wavelet transformer 603. At this time, since subbands other than LL are not decoded yet, all transform coefficients are processed as zero.

Figure 32:
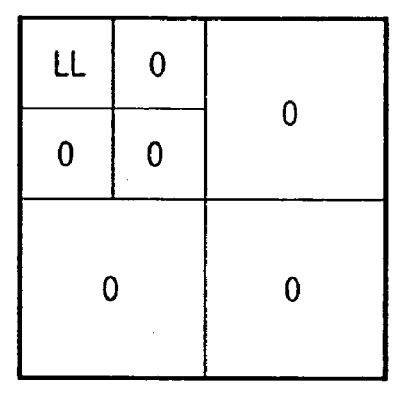

That is, when transformation of two levels is done upon encoding, an image signal is generated by making computations under the assumption that zero coefficients are contained in all subbands HL2, LH2, HH2, HL1, LH1, and HH1, as shown in FIG. 32. The image generated in this manner will be referred to as a reference image hereinafter. The reference image is outputted to and stored in the reference image memory 608.

The controller 607 controls the code input unit 601 to read the subsequent code sequence. In this embodiment, the subsequent code sequence contains encoded data corresponding to all subbands other than LL in FIG. 30D. These encoded data undergo decoding and dequantization in the same manner as described above to restore transform coefficients, which are input to the image quality improvement processor 606.

The image quality improvement processor 606 selects pixels which are to undergo an image quality improvement process on the basis of the pixel values of the reference image stored in the reference image memory 608. That is, a region of pixels to be processed on the reference image is detected, and when M represents the average value of the pixel values (more specifically, luminance values) in that region, a process described by equation (23) or (24) is done as long as:

$$M < Ti \tag{25}$$

where Ti is a value (threshold value) determined by an X-ray image sensing situation. In this manner, an image quality improvement process is executed for high-frequency subband pixels which correspond to a given region in the reference image in which the average luminance value is less than Ti.

Figure 33:
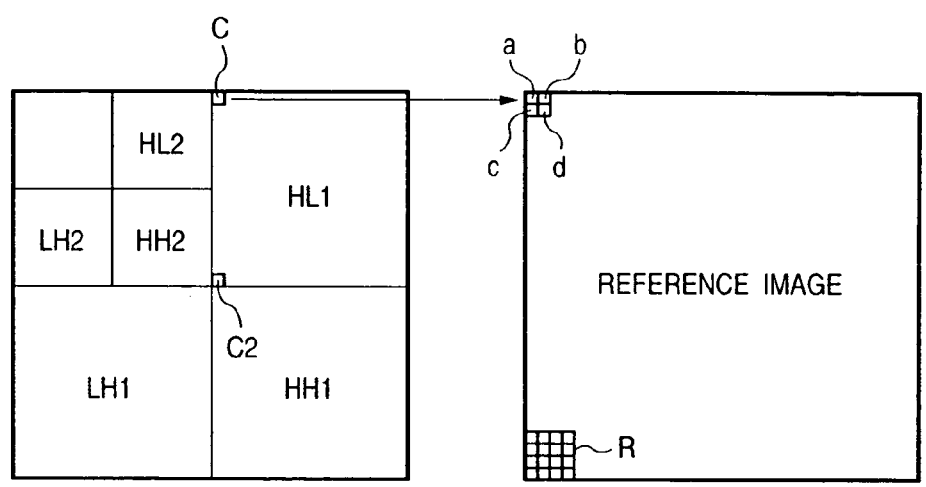
FIG. 33 shows the relationship between transform coefficients to be processed, and a region on the reference image occupied by the transform coefficients according to the seventh embodiment of the present invention.

FIG. 33 shows the relationship between the coefficients and reference image at that time. When four pixels a, b, c, and d in a region on the reference image correspond to a coefficient C in HL1 to be processed, we have:

$$M = (a+b+c+d)/4 \tag{26}$$

When this value M corresponds to a region less than Ti, the absolute value of that coefficient C is compared with T. If the absolute value of the coefficient C is smaller than T, the coefficient C is determined to be noise, and is converted into zero. The coefficients processed in this way are output to the inverse discrete wavelet transformer 603.

Figure 36:
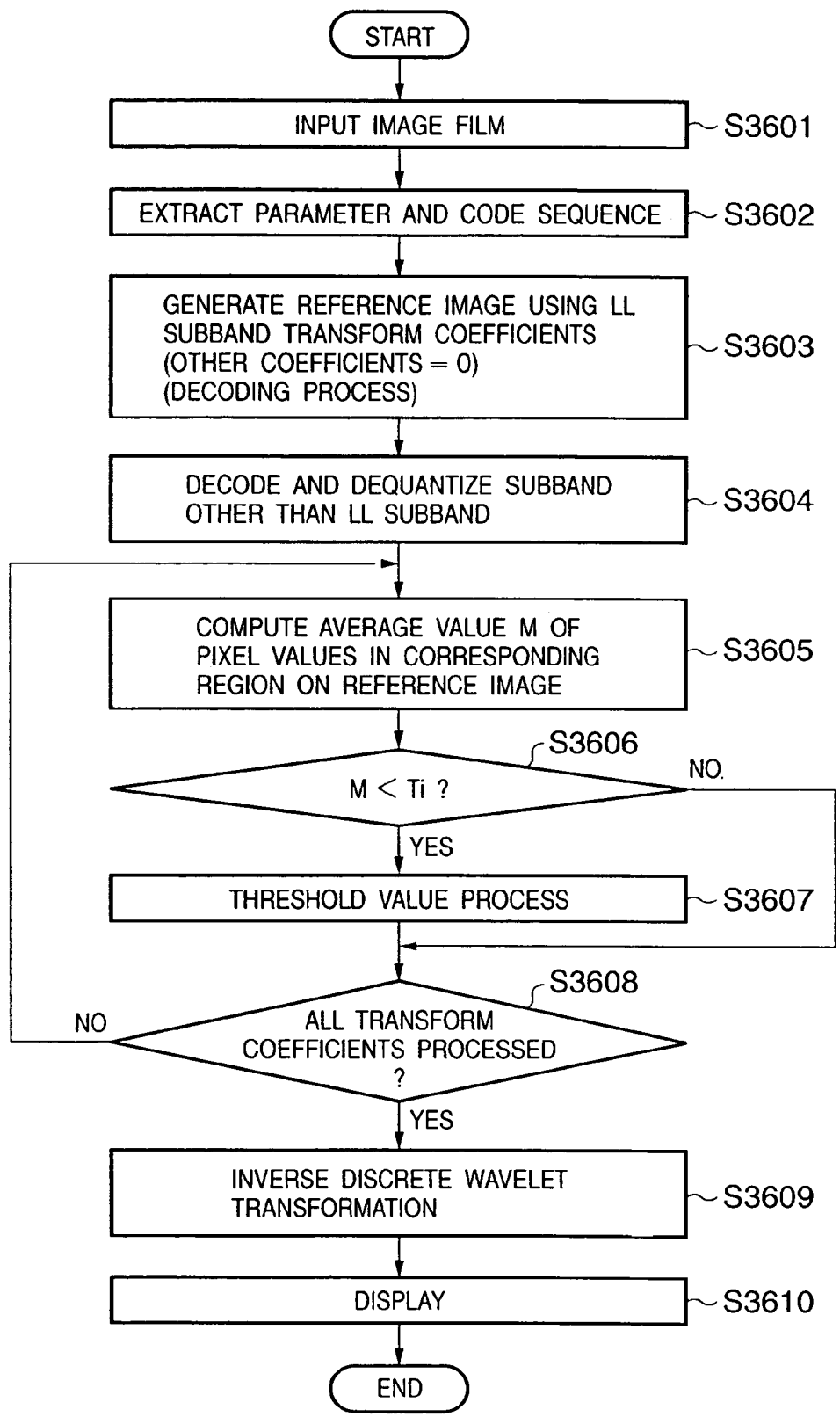
FIG. 36 is a flow chart showing a decoding process in the image processing system according to the seventh embodiment of the present invention.

The inverse discrete wavelet transformer 603 computes the inverse discrete wavelet transforms of the sequentially input coefficients of the subbands other than LL and those of the previously input LL subband in combination to generate an image signal (image), and outputs the image to the image display device 7, thus displaying an image. FIG. 36 is a flow chart that summarizes the aforementioned decoding process in this embodiment. Individual processes in the flow chart will be explained below.

An image file stored by the storage/transfer device 4 is read out (step S3601), and parameters and code sequence are extracted from the file (step S3602). Transform coefficients contained in subbands other than the LL subband are set at zero, and the aforementioned reference image is generated using the decoding process mentioned above (step S3603).

The subbands other than the LL subband undergo entropy decoding and dequantization to obtain transform coefficients (step S3604). A region on the reference image corresponding to transform coefficients in a given subband other than the LL subband is obtained, and the average value M in this region is computed (step S3605). A threshold value process described by equations (23) and (24) is done (step S3607) in accordance with a discrimination process described by inequality (25) (step S3606). The processes in steps S3605 to S3607 are repeated for transform coefficients in all subbands other than the LL subband (step S3608). Then, inverse discrete wavelet transformation is done using the coefficients of the LL subband together to generate an image signal (step S3609), and the image signal is displayed (step S3610).

In an image obtained by an X-ray image sensing device, a low luminance level portion of the image has a low X-ray transmittance, resulting in many noise components and poor S/N ratio. Therefore, in this embodiment, upon decoding the code sequence obtained by compression-encoding an image, only the lowest-frequency subband in the code sequence is decoded to generate the reference image. Since this reference image represents an average luminance level of an original image, many quantization noise components are contained in a low luminance level region in the reference image. When high-frequency coefficients corresponding to such region undergo a threshold value process, an effective noise removal process is implemented, and an image with the improved image quality can be obtained.

Figure 34:
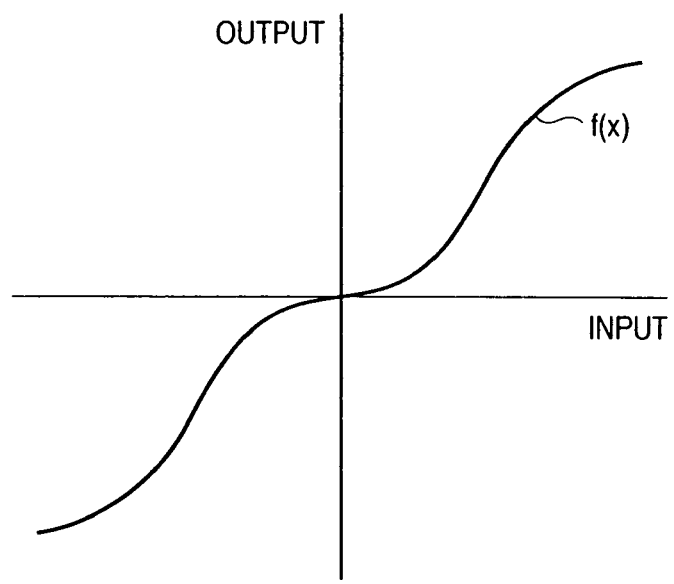
FIG. 34 is a graph for explaining an example of a function used upon executing a transform process of transform coefficient by an image quality improvement processor according to the seventh embodiment of the present invention.

In this embodiment, high-frequency subband coefficients undergo a threshold value process on the basis of formulas (23), (24), and (25). However, the present invention is not limited to such specific process. For example, the image quality improvement processor 606 may convert the input coefficient c' by:

$$cn = f(c') \qquad (27)$$

where f(x) is a function having predetermined input/output characteristics. For example, when the function has the input/output relationship shown in FIG. 34, a value of a coefficient not more than a given input level is suppressed, while values within a given range are emphasized.

When predetermined high-frequency subband coefficients undergo conversion described by equation (27), noise components with small values are suppressed, and signal components having sufficiently large values can be emphasized, thus improving the image quality after inverse transformation.

In this embodiment, only the LL subband is used upon generating the reference image. However, the present invention is not limited to this. More specifically, a predetermined number of subbands with respect to encoded data of subbands contained in the code sequence may be used.

Figure 37:
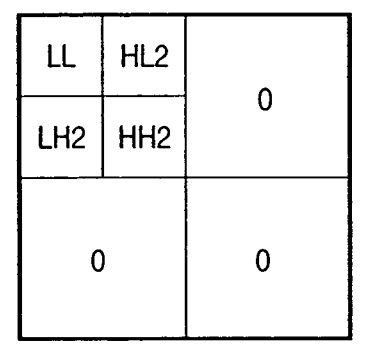

FIG. 37 shows a subband format upon generating a reference image by reading encoded data corresponding to HL2, LH2, and HH2 in addition to LL. In FIG. 37, all coefficients of subbands HL1, LH1, and HH1 are set at zero, but decoded values are used for the remaining subbands.

In this embodiment, a reference range with respect to the reference image is limited to a region of coefficients to be processed on an original image. Alternatively, a broader range may be set as a reference region. For example, in this embodiment, a 2×2 pixel region (a to d) is referred to for the coefficient C in FIG. 33. Alternatively, the average value may be computed for a coefficient C2 with reference to a 4×4 region indicated by R. By changing the reference region in this way, a process suited to a local feature of an image can be done. That is, a process can be done without being influenced by fine changes in image by setting a broader reference region.

In this case, the user may interactively determine the reference range of the reference image. For example, the reference image may be displayed in practice, and the user may designate a portion that requires higher image quality on the displayed image, thereby determining the reference range upon processing coefficients corresponding to the designated portion. In this case, when a small reference range is set for the portion that requires higher image quality, and a broader reference range is set for other portions, an adaptive image quality improvement process can be implemented.

[Other Embodiments]

Note that the present invention is not limited to a system comprising a plurality of devices, but may be applied to a single apparatus constituted by parts having functions of those devices.

The scope of the present invention includes not only each of the first to seventh embodiments, but also various combinations of these embodiments.

Furthermore, the present invention is not limited to the system and method alone for implementing the aforementioned embodiments, but the scope of the present invention includes a case wherein the above embodiments are achieved by supplying a program code of software that can implement the functions of the above-mentioned embodiments to a computer (or a CPU or MPU) in a system or apparatus, and making the computer control various devices in the system or apparatus.

In this case, the program code itself read out from the storage medium implements the functions of the above-mentioned embodiments, and the program code itself, and means for supplying the program code to the computer (i.e., a storage medium which stores the program code) are included in the scope of the present invention.

As the storage medium for storing such program code, for example, a floppy disk, hard disk, optical disk, magneto-optical disk, CD-ROM, magnetic tape, nonvolatile memory card, ROM, and the like may be used.

The program code is included in the scope of the embodiments not only when the functions of the above embodiments are implemented by controlling various devices according to the supplied program code alone but also when the functions of the embodiments are implemented by collaboration of the program code and an OS (operating system) or another application software running on the computer.

Furthermore, the scope of the present invention includes a case wherein the functions of the above-mentioned embodiments are implemented by some or all of actual processing operations executed by a CPU or the like arranged in a function extension board or a function extension unit, which is inserted in or connected to the computer, after the supplied program code is written in a memory of the extension board or unit.

When the present invention is applied to the aforementioned storage medium, that storage medium stores program codes corresponding to the flow charts described above. To restate, according to the present invention, noise contained in an original image can be removed upon compressing/decoding an image in units of bit planes.

As many apparently widely different embodiments of the present invention can be made without departing from the spirit and scope thereof, it is to be understood that the invention is not limited to the specific embodiments thereof except as defined in the appended claims.

What is claimed is:

1. An image processing system for encoding and decoding an image, comprising:
   an encoding device for encoding the image in units of bit planes to generate a code sequence; and
   a decoding device for decoding the code sequence in units of bit planes to generate the image, wherein said encoding device determines a region of interest in the image, and removes noise by deleting data of bit planes of levels lower than a lower-limit bit plane for only a region other than the determined region of interest in at least one of said encoding device and said decoding device.

2. The system according to claim 1, wherein the lower-limit bit plane is determined on the basis of information that pertains to an image sensing situation.

3. The system according to claim 2, wherein the image to be encoded by said encoding device is an X-ray image, and the information that pertains to an image sensing situation is an X-ray dosage.

4. The system according to claim 1, wherein said encoding device performs discrete wavelet transformation.

5. The system according to claim 4, wherein said decoding device deletes data of bit planes of levels lower than the lower-limit bit plane, of bit planes which belong to a predetermined subband.

6. The system according to claim 5, wherein the predetermined subband is a subband other than the lowest-frequency subband.

7. The system according to claim 1, wherein a bit plane decoding process is aborted at the lower-limit bit plane, and bits of transform coefficients contained in all subsequent bit planes up to a least significant bit plane are set at zero.

8. The system according to claim 1, wherein said encoding device generates the code sequence by decomposing transform coefficients generated by computing discrete wavelet transforms of the image into bit planes corresponding in number to the transform coefficients, and encoding in units of bit planes.

9. The system according to claim 1, further comprising an input device for sensing and inputting an image to be encoded by said encoding device.

10. The system according to claim 1, further comprising an image display device for displaying the image decoded by said decoding device.

11. The system according to claim 1, wherein said encoding device shifts up only the region of interest by a predetermined number of bits by multiplying data of the region of interest by a predetermined value, and removes noise by deleting data of bit planes of levels lower than the lower-limit bit plane for the entire region after the shift-up process.

12. The system according to claim 11, wherein said encoding device determines the region of interest on the basis of a transform coefficient group included in the lowest-frequency range of transform coefficients generated by computing discrete wavelet transforms of an image.

13. The system according to claim 11, wherein said encoding device computes the predetermined number of bits to prevent levels of bit planes of the region of interest from overlapping levels of bit planes of a region other than the region of interest.

14. The system according to claim 11, wherein said encoding device computes the predetermined number of bits on the basis of an expected noise level.

15. The system according to claim 14, wherein the expected noise level is computed from the transform coefficient group contained in the lowest-frequency range.

16. The system according to claim 11, wherein said encoding device appends information indicating the predetermined number of bits to the code sequence.

17. The system according to claim 1, wherein said encoding device generates the code sequence by forming layers using only bit planes not less than the lower-limit bit plane, and combining the layers.

18. An image processing system for encoding and decoding an image, comprising:
   an encoding device for encoding the image in units of bit planes to generate a code sequence;
   a decoding device for decoding the code sequence in units of bit planes to generate the image; and
   a file generation device for generating a file by appending predetermined information that pertains to the lower-limit bit plane to the code sequence,
   wherein noise on the image is removed by deleting data of bit planes of levels lower than a lower-limit bit plane in at least one of said encoding device and said decoding device.

19. The system according to claim 18, wherein the predetermined information includes the name of a patient to be sensed, an image sensing date, an X-ray dosage upon image sensing, and information which pertains to the code sequence.

20. An image processing system for encoding and decoding an image, comprising:
   an encoding device for encoding the image in units of bit planes to generate a code sequence; and
   a decoding device for decoding the code sequence in units of bit planes to generate the image,
   wherein said encoding device generates transform coefficients by computing discrete wavelet transforms of the image,
   specifies a transform coefficient group of the lowest-frequency subband corresponding to transform coefficients in a subband other than the lowest-frequency subband in a positional relationship on the image, and
   specifies a lower-limit bit plane of the transform coefficients in the subband on the basis of the specified transform coefficient group, and
   wherein noise on the image is removed by deleting data of bit planes of levels lower than the lower-limit bit plane in at least one of said encoding device and said decoding device.

21. The system according to claim 20, wherein said encoding device computes an average value of the specified transform coefficient group, checks if the average value is not less than a predetermined value, and specifies the lower-limit bit plane of the transform coefficients in the subband in accordance with the checking result.

22. An image processing system for encoding and decoding an image, comprising:
   an encoding device for generating a code sequence by generating transform coefficients in units of a plurality of frequency ranges by means of frequency transformation of an image, and encoding the transform coefficients; and
   a decoding device for restoring the transform coefficients from the code sequence, reclaiming a reference image on the basis of the transform coefficients of a given frequency range of the restored transform coefficients, and removing noise by processing the transform coefficients of the frequency ranges other than the given frequency range on the basis of the reference image.

23. The system according to claim 22, wherein the given frequency range includes the lowest-frequency range of the plurality of frequency ranges.

24. The system according to claim 22, wherein the given frequency range includes a predetermined number of frequency ranges including the lowest-frequency range of the plurality of frequency ranges.

25. The system according to claim 22, wherein the processing of the transform coefficients in said decoding device includes a comparison process for comparing with a predetermined coefficient, and a conversion process for converting a transform coefficient not more than the predetermined threshold value as a result of comparison to zero.

26. The system according to claim 22, wherein the processing of the transform coefficients in said decoding device includes a level conversion process which is performed on the basis of a predetermined function using the transform coefficient as a variable.

27. The system according to claim 22, wherein said decoding device executes the process on the basis of pixel values in a region of the reference image corresponding to the transform coefficients to be processed.

28. The system according to claim 22, wherein said decoding device executes the process on the basis of an average value of pixel values in a region of the reference image corresponding to the transform coefficients to be processed.

29. The system according to claim 28, wherein the pixel values are luminance values of pixels.

30. An image processing apparatus for decoding an image,
which restores transform coefficients from a code sequence obtained by computing and encoding frequency transforms of an image, and reclaims a reference image on the basis of the transform coefficients of a given frequency range of the restored transform coefficients, and
removes noise by processing the transform coefficients of frequency ranges other than the given frequency range on the basis of the reference image.

31. An image processing method for decoding an image, comprising:
a step of restoring transform coefficients from a code sequence obtained by computing and encoding frequency transforms of an image, and reclaiming a reference image on the basis of the transform coefficients of a given frequency range of the restored transform coefficients; and
a step of removing noise by processing the transform coefficients of frequency ranges other than the given frequency range on the basis of the reference image.

32. A computer program product embodied in a computer-readable medium embodying a program for implementing an image processing method for decoding an image, the program comprising:
program code for a step of restoring transform coefficients from a code sequence obtained by computing and encoding frequency transforms of an image, and reclaiming a reference image on the basis of the transform coefficients of a given frequency range of the restored transform coefficients; and
program code for a step of removing noise by processing the transform coefficients of frequency ranges other than the given frequency range on the basis of the reference image.

* * * * *

UNITED STATES PATENT AND TRADEMARK OFFICE
CERTIFICATE OF CORRECTION

PATENT NO.        : 6,985,632 B2
APPLICATION NO. : 09/835329
DATED             : January 10, 2006
INVENTOR(S)       : Makato Sato et al.

It is certified that error appears in the above-identified patent and that said Letters Patent is hereby corrected as shown below:

ON COVER PAGE AT (56) FOREIGN PATENT DOCUMENTS

"9212623" should read --9-212623--.

COLUMN 14

Line 16, "2B" should read --$2^B$--.

COLUMN 17

Line 11, "E" should read --$\varepsilon$--; and
Line 21, "E" should read --$\varepsilon$--.

Signed and Sealed this

Twenty-eighth Day of November, 2006

JON W. DUDAS
*Director of the United States Patent and Trademark Office*